US012252932B2

(12) United States Patent
Schmick et al.

(10) Patent No.: US 12,252,932 B2
(45) Date of Patent: Mar. 18, 2025

(54) LOCKABLE CORNER BRACKET

(71) Applicant: UBLOCKOUT TECHNOLOGIES PTY LTD, Adelaide (AU)

(72) Inventors: Mark Schmick, Rostrevor (AU); Chris Doley, Rostrevor (AU)

(73) Assignee: UBLOCKOUT TECHNOLOGIES PTY LTD, Adelaide (AU)

( * ) Notice: Subject to any disclaimer, the term of this patent is extended or adjusted under 35 U.S.C. 154(b) by 0 days.

(21) Appl. No.: 18/683,866

(22) PCT Filed: Sep. 1, 2022

(86) PCT No.: PCT/AU2022/051073
§ 371 (c)(1),
(2) Date: Feb. 15, 2024

(87) PCT Pub. No.: WO2023/028660
PCT Pub. Date: Mar. 9, 2023

(65) Prior Publication Data

US 2024/0328250 A1 Oct. 3, 2024

(30) Foreign Application Priority Data

Sep. 1, 2021 (AU) ................................ 2021902840

(51) Int. Cl.
*E06B 9/50* (2006.01)
*E06B 9/44* (2006.01)
(Continued)

(52) U.S. Cl.
CPC .................. *E06B 9/44* (2013.01); *E06B 9/50* (2013.01); *E06B 9/60* (2013.01); *E06B 9/72* (2013.01); *E06B 9/78* (2013.01); *E06B 2009/425* (2013.01)

(58) Field of Classification Search
CPC ..... E06B 9/50; E06B 9/72; E06B 9/68; E06B 9/40; E06B 9/42; E06B 9/44; E06B 9/60;
(Continued)

(56) References Cited

U.S. PATENT DOCUMENTS 231,649 A 8/1880 Burrell et al.
740,033 A 9/1903 McNamara
(Continued)

FOREIGN PATENT DOCUMENTS

AU 2018100505 A4 5/2018
CN 2054478 U 3/1990
(Continued)

*Primary Examiner* — Daniel P Cahn
*Assistant Examiner* — Jeremy C Ramsey
(74) *Attorney, Agent, or Firm* — AVEK IP, LLC; Mark C. Young

(57) ABSTRACT

A lockable corner bracket includes a lockable encapsulated axle pulley which houses one end of a length of cord, with the free end secured to a side bracket. A cord locking mechanism is used to lock the encapsulated axle pulley and prevent unwinding of the cord, or loss of tension, during transport and installation to facilitate do-it-yourself installation. The axle pulley is further configured with a central slot to allow frontal insertion of a roller tube. The corner bracket may be used with a manual roller screen including roller tubes fitted with spring assist systems to facilitate winding and unwinding of the screen, or with roller tubes fitted with a tubular motor to drive rotation of the roller tube.

10 Claims, 20 Drawing Sheets

(51) Int. Cl.

| | |
|---|---|
| ***E06B 9/60*** | (2006.01) |
| ***E06B 9/72*** | (2006.01) |
| ***E06B 9/78*** | (2006.01) |
| *E06B 9/42* | (2006.01) |

(58) Field of Classification Search

CPC .... E06B 9/54; E06B 9/08; A47H 1/13; A47H 1/14

See application file for complete search history.

(56) References Cited

U.S. PATENT DOCUMENTS

| | | | | |
|---|---|---|---|---|
| 901,067 | A | 10/1908 | Casson | |
| 923,153 | A | 6/1909 | Dennhardt | |
| 1,335,573 | A | 3/1920 | Forcoz | |
| 1,780,461 | A | 11/1930 | Byars | |
| 1,853,150 | A | 4/1932 | Schultes | |
| 1,893,651 | A | 1/1933 | Ray | |
| 3,911,990 | A | 10/1975 | Eugene et al. | |
| 4,359,081 | A | 11/1982 | Brower | |
| 4,762,160 | A | 8/1988 | Bechtold et al. | |
| 4,896,714 | A | 1/1990 | Ellis | |
| 5,456,303 | A | 10/1995 | Horinouchi | |
| 5,533,559 | A | 7/1996 | Judkins | |
| 5,915,443 | A | 6/1999 | Lindley, Jr. | |
| 6,082,432 | A | 7/2000 | Kissinger | |
| 6,116,321 | A | 9/2000 | Kavchar | |
| 6,167,936 | B1 | 1/2001 | Stover et al. | |
| 6,209,610 | B1 | 4/2001 | Davies et al. | |
| 6,223,803 | B1 | 5/2001 | Nielsen | |
| 6,463,983 | B1 | 10/2002 | Lang | |
| 6,478,070 | B2 | 11/2002 | Poppema | |
| 6,591,890 | B1 | 7/2003 | Grubb et al. | |
| 6,629,555 | B2 | 10/2003 | Deblolck et al. | |
| 6,679,002 | B2 | 1/2004 | Davies et al. | |
| 6,814,127 | B2 | 11/2004 | Tagtow et al. | |
| 7,669,634 | B2 | 3/2010 | Sugiyama et al. | |
| 8,011,413 | B2 | 9/2011 | Poppema | |
| 8,056,601 | B2 | 11/2011 | Kirby et al. | |
| 8,113,264 | B2 | 2/2012 | Kirby et al. | |
| 8,191,601 | B2 | 6/2012 | Okachi et al. | |
| 8,439,098 | B1 | 5/2013 | Jones et al. | |
| 8,631,850 | B2 | 1/2014 | Fayette et al. | |
| 8,656,978 | B2 | 2/2014 | Goldenberg et al. | |
| 10,731,411 | B2 * | 8/2020 | Holt | E06B 9/72 |
| 2001/0042346 | A1 | 11/2001 | Brioschi | |
| 2004/0129849 | A1 * | 7/2004 | Walker | E06B 9/72 248/266 |
| 2004/0154753 | A1 | 11/2004 | Tagtow et al. | |
| 2005/0051280 | A1 | 3/2005 | Thomas et al. | |
| 2005/0161175 | A1 | 7/2005 | Tussinger | |
| 2005/0205224 | A1 | 9/2005 | Dalle Nogare et al. | |
| 2005/0257899 | A1 | 11/2005 | Lee et al. | |
| 2006/0225847 | A1 | 10/2006 | Davies et al. | |
| 2007/0227676 | A1 | 10/2007 | Legay | |
| 2008/0163988 | A1 | 7/2008 | Hicks et al. | |
| 2017/0211325 | A1 | 7/2017 | Riemelmoser et al. | |
| 2018/0112463 | A1 * | 4/2018 | Derk, Jr. | E06B 9/44 |
| 2018/0171709 | A1 | 6/2018 | Haarer et al. | |
| 2018/0310745 | A1 * | 11/2018 | Giri | E06B 9/58 |
| 2019/0128063 | A1 | 5/2019 | Bohlen et al. | |
| 2019/0145166 | A1 | 5/2019 | Campagna | |
| 2020/0300033 | A1 | 9/2020 | Fisher, II et al. | |
| 2021/0262286 | A1 * | 8/2021 | Campagna | E06B 9/60 |
| 2022/0381085 | A1 * | 12/2022 | Diehl | H01Q 1/38 |
| 2023/0112345 | A1 * | 4/2023 | Menendez | E06B 9/44 160/310 |
| 2024/0044204 | A1 * | 2/2024 | Shivell | A47H 1/13 |

FOREIGN PATENT DOCUMENTS

| | | | |
|---|---|---|---|
| CN | 101021141 | A | 8/2007 |
| DE | 4036892 | A1 | 5/1992 |
| FR | 2686372 | A1 | 7/1993 |
| GB | 433498 | A | 8/1935 |
| GB | 500451 | A | 2/1939 |
| GB | 1188690 | A | 4/1970 |
| GB | 2166480 | A | 5/1986 |
| JP | 2001234678 | A | 8/2001 |
| TW | 201122208 | B | 8/2012 |
| WO | 2010034156 | A1 | 4/2010 |
| WO | 2021174285 | A1 | 9/2021 |

* cited by examiner

SECTION E-E

SECTION F-F

UBLOCKOUT

SECTION D-D

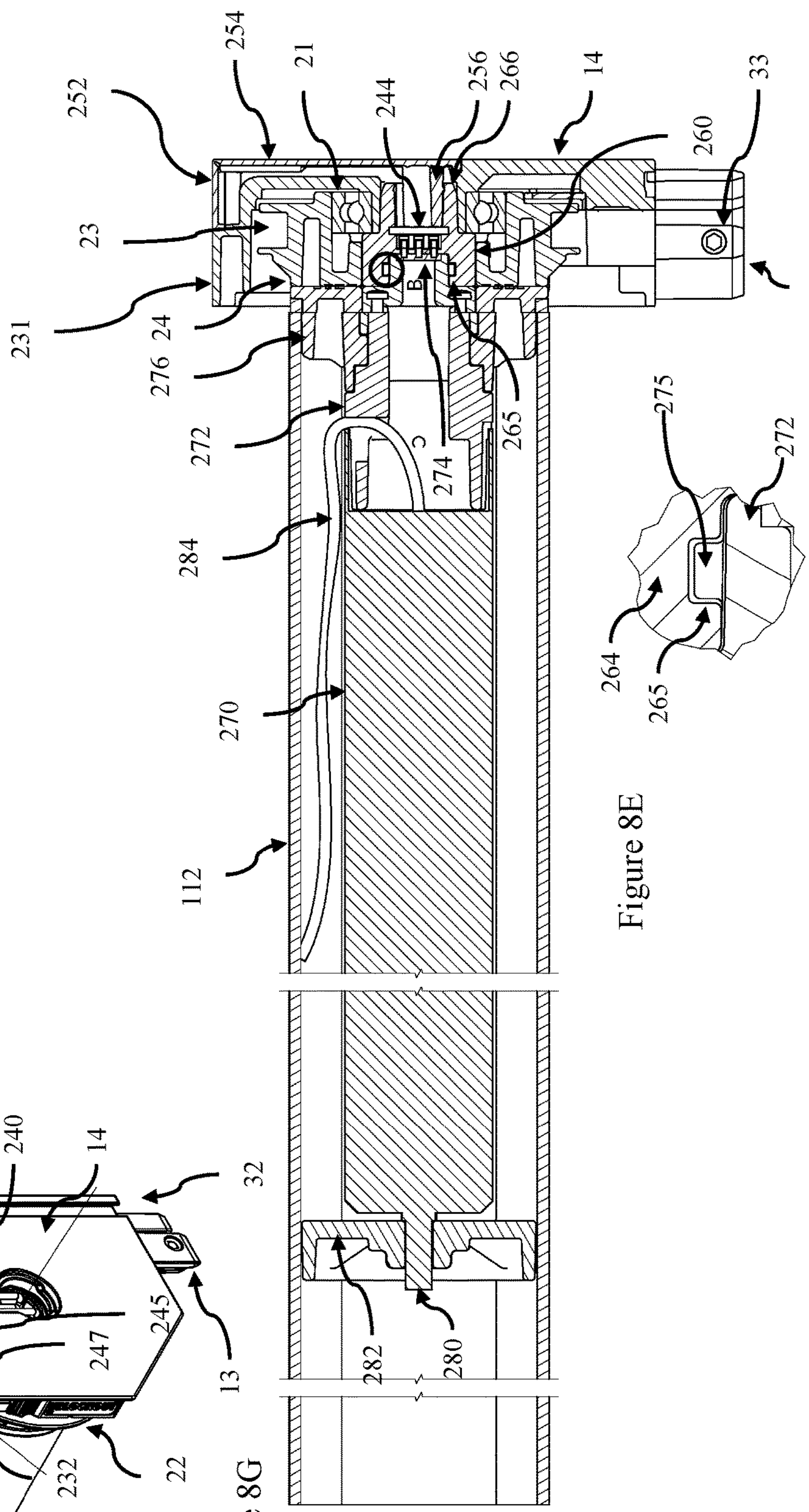
Figure 8E
Figure 8F
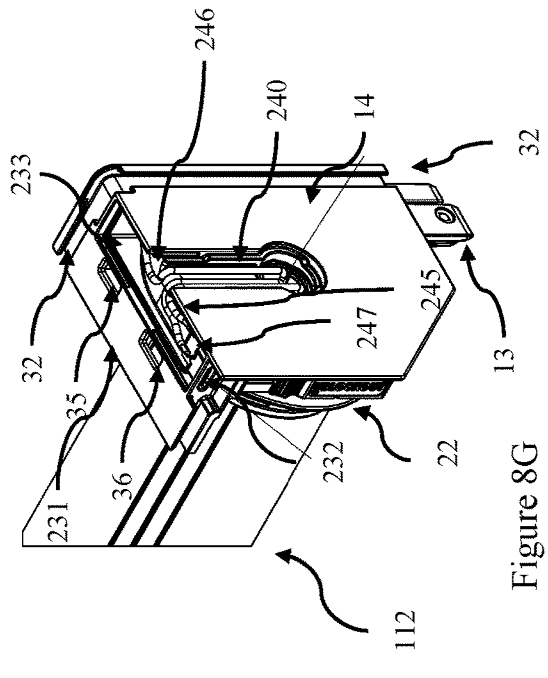
Figure 8G

LOCKABLE CORNER BRACKET

CROSS-REFERENCE TO RELATED APPLICATIONS

The present application claims priority from Australian Provisional Patent Application No. 2021902840 titled "Lockable Corner Bracket" and filed on 1 Sep. 2021, the content of which is hereby incorporated by reference in its entirety.

TECHNICAL FIELD

The present disclosure relates to roller screen systems for covering a window or door. In a particular form the present disclosure relates to roller screen systems configured for simplified Do-It-Yourself (DIY) installation.

BACKGROUND

Roller screen systems (also known as roller shade systems) comprise a flexible screen (or shade) rolled around a roller tube which is driven to rotate to extend and retract the screen across a window or door opening. The roller tube thus acts as a spindle and thus the roller tube will also be referred to as a spindle or spindle tube in the following discussion. The extension and retraction of the screen over a screen opening may be directly driven by a hand grasping the cross bar/handle and manually moving the screen up or down, or by manually driving the roller tube via a cord attached to a pulley located on the end of the roller tube (spindle), or via a motor system that drives rotation of the roller tube (spindle).

As the screen is wound on and off the roller tube, the weight of the screen depending from the roller tube will vary, leading to a variable torque on the roller tube. Thus in order to ensure smoother operation of hand or cord driven systems and/or to reduce the load on the motor in motor driven systems, some systems feature a counterbalance arrangement such as a helical wound tension spring located within the roller tube to act as a counterbalance against the weight of the screen when it is unwound from or wound onto the roller tube. These counterbalancing systems may be used in conjunction with braking systems, or may be used in standalone hand or cord driver systems. One such system is described in U.S. Ser. No. 10/138,676B2 that also allows for pre-tensioning of the helical spring to adjust for the specific weight, spring and frictional properties of the system.

However a problem with systems using helical wound tension springs is that they are often limited in the amount of usable rotations that are necessary for larger drops/lengths on screens and blinds, which may prevent use on large screens and blinds. Additionally they require specialised brackets and are quite complex with many parts leading to increased manufacturing and assembly costs, as well as more complex maintenance. This complexity also increases the training requirements for installers to ensure that the system is both correctly installed and maintained.

Alternative systems have also been proposed which feature tension adjustment arrangements using cords and pulleys located within the frame. In particular one WO 2016/015084 (PCT/AU2015/000436) describes a retrofitable retractable screen system specifically designed to enable retrofitting of a retractable screen system into an existing window cavity. The system comprises a frame which is designed to be inserted into an existing window cavity (the window frame) and which houses a roller assembly comprising a screen, a spindle and spindle rotational assembly. A cord is used to drive the spindle rotation assembly and thus wind the screen back onto or off the spindle as the screen is retracted or extended across the screen opening. The frame houses a guide assembly which guides the cord and features a tension adjustment arrangement to compensate for the change in tension in the cord (due to change in weight) as the screen is extended or retracted over the opening. The tension adjustment arrangement described in this application enabled smooth hand driven operation of the screen from an open to a closed (block-out) position, as well as to any point between these two extremes. Further the guide system was designed to be compact to enable the system to have a low profile so that it would easily fit into an existing window frame and not extend in from the window frame or unnecessarily obscure the window panel.

Whilst embodiments of the system were a significant improvement over existing systems, and met with considerable commercial success, there is further room for improvement. Currently the system requires onsite assembly by a trained installer. The installer is required to assemble the frame, tube roller, screen and spindle rotation assembly prior to installation into the window cavity/frame. This includes assembling the frame members, fitting the roller tube and screen into the frame, assembling the spindle rotation assembly including the cord, pulleys, tension adjustment arrangement, and tensioning of the cord circuit. The assembled system is then fitted into the window cavity/frame. Correct assembly and tensioning of the pulleys and tension arrangement is technically challenging and thus requires a trained installer. Further the roller tube and screen make the assembled frame very top heavy. This leaves the corner bracket susceptible to damage and thus requiring careful installation to avoid such damage. The installer must also carefully check and seal any gaps between the screen frame and window frame to prevent any ingress of light which would otherwise reduce the blockout effect of the screen. Finally replacement of the screen (and the roller tube) requires at least partial disassembly of the frame and pulley system, which again requires a trained installer. Assembling and installation of the system takes an experienced installer around 45 minutes assuming no complications thus limiting the total number of installations that can be performed in a day.

Accordingly there is a need to further improve the system to both simplify installation and thus reduce the reliance on trained installers, or at least provide a useful alternative to existing screen systems.

SUMMARY

According to a first aspect, there is provided a corner bracket and side frame member assembly for a retractable screen system, comprising

- a corner bracket comprising:
  - an axle pulley comprising a roller tube support structure located on an external side of the axle pulley wherein the roller tube support structure defines a slot formed from a slot opening and at least one receiving cavity opposite the slot opening such that in use a roller tube is inserted into the slot and the at least one receiving cavity receives at least one locking projection located on an end surface of the roller tube;
  - a locking mechanism for locking the pulley;

a side frame member wherein the corner bracket is connected to or formed at a first end of the side frame member, the side frame member comprising a cord tensioning system housed in the side frame member and comprising a plurality of pulleys and a cord tension arrangement that defines a cord circuit wherein in use the cord tension adjustment arrangement adjusts the tension in the cord as a screen is wound and unwound from the roller tube;

a cord, wherein a first end is attached around the axle pulley, and directed through the cord tensioning system, and the second end is fixed to the side frame member.

According to a second aspect, there is provided a screen system comprising atop frame member, a roller tube, and at least one corner bracket and side frame member assembly according to the first aspect.

In a further form the top frame member, corner bracket and side frame member further comprise a perimeter track comprising a pile seal.

In one form, the at least one receiving cavity comprises a pair of receiving cavities separated by a wedge, and the end surface of the roller tube comprises two pairs of locking projections, each pair located on opposite sides of the end surface such that the roller tube is inserted by sliding a pair of the locking projections into the slot through the slot opening until one pair of the locking projections are received in the pair of receiving cavities, and the other pair of locking projections are located in the slot opening to lock the roller tube with respect to the axle pulley.

In a further form, the roller tube further comprises a spring assist mechanism housed within the roller tube, wherein the spring assist mechanism comprises a helical spring located on a shaft within the roller tube, wherein one end of the helical spring is fixed and the other end may be rotated, and the spring assist mechanism further comprises a ratchet mechanism to allow pre-tensioning of the helical spring prior to insertion of the roller tube into the corner bracket, and the spring assist mechanism further comprises a ratchet disengaging projection located between each pair of locking projections, such that when the roller tube is inserted into the slot the wedge depresses the ratchet disengaging projection to disengage the ratchet mechanism to prevent further adjustment of the spring tension.

In one form, the roller tube support structure further comprises a mounting projection located on the side wall and which forms a support surface for a ball bearing which supports the axle pulley and the roller tube support structure further comprises a torque stub with a proximal wall section and a distal flange section, wherein the proximal wall section is received within the mounting projection and the distal flange section forms a central section of the slot.

In one form, the roller tube houses a tubular motor and a drive wheel within an interior cavity of the roller tube, wherein a distal end of the tubular motor comprises a spindle which passes through the drive wheel, and the drive wheel is locked to the roller tube such that rotation of the spindle drives rotation of the roller tube, and a proximal end of the tubular motor is connected to a motor head with a plurality of electrical contacts on a proximal face, and proximal end of the roller tube comprises a crown wheel located over the motor head and locked to the roller tube and mounted such that the crown wheel can rotate with respect to the motor head, and the at least one locking projection is formed on a proximal surface of the crown wheel, and the roller tube support structure further comprises a torque stub that passes through a central aperture in the axle pulley and is configured to form a central section of the slot, and a face of the torque stub forming the slot comprises a plurality of electrical spring contacts which are connected to a power connector provided in an external surface of the corner bracket, and the motor head comprises a plurality of electrical contacts wherein at least two of the plurality of electrical contacts are connected to a battery located in the tubular motor, and the plurality of electrical contacts are located on the motor head such that when the roller tube is inserted into the slot, the electrical spring contacts provide an electrical connection to the electrical contacts, such that, in use, power provided by the power connector is used to charge the battery, and an antenna is connected to the tubular motor wherein the tubular motor is configured to drive rotation of the spindle in response to receiving a drive command from a remote controller via the antenna.

In a further form, the plurality of electrical spring contacts comprises a positive spring contact and a negative or ground spring contact which are connected to the power connector, and an antenna spring contact which is connected to an antenna wire located in the corner bracket, and the plurality of electrical contacts comprises six electrical contacts arranged in two columns of three rows, wherein rows in the first column are ordered as a positive contact, an antenna contact and a negative contact, and the rows in the second column are a reverse order so that in use, when the roller tube is inserted into the slot the electrical contacts will match with the spring contacts regardless of an orientation of the roller tube.

In a further form, the plurality of electrical spring contacts comprises a positive spring contact and a negative or ground spring contact which are connected to the power connector, and the plurality of electrical contacts comprises four electrical contacts arranged in two columns of two rows, wherein the electrical contacts in the rows of the first column are ordered as a positive contact and a negative or ground contact, and the rows in the second column are in a reverse order so that in use, when the roller tube is inserted into the slot the electrical contacts will match with the spring contacts regardless of an orientation of the roller tube, and an antenna cable is located within the roller tube and is directly connected to the tubular motor.

In one form, each of the at least one locking projection is formed with a key projection in a side wall and each inner wall of the slot in the roller tube support structure comprises a slot which is configured to receive the key projections as the roller tube is inserted into the slot and the torque stub comprises a proximal wall section and a distal flange section which forms a central section of the slot and is formed with two key slots in each inner wall of the distal flange section configured to receive the key projections as the roller tube is inserted into the slot.

In one form, the locking mechanism comprises a locking wedge comprising a wedge portion and a distally directed lock projection, wherein the locking wedge is located in a channel formed in a side wall of the corner bracket, and a lock slide comprising a slider connected to a panel comprising a curved slot with a width configured to receive the distal lock projection, and the panel extends through a guide slot formed in a wall extending distally from the side wall such that sliding of the lock slide along the guide slot 15 in a first direction drives the distal lock projection along the curved slot path and causes the lock wedge to engage the axle pulley to lock the axle pulley and sliding the lock slide along the guide slot 15 in a second direction opposite the first direction drives the distal lock projection along the curved slot path and causes the lock wedge to disengage the axle pulley to unlock the axle pulley.

In a further form, the slider is a peaked block mounted orthogonally with respect to the panel.

According to a third aspect, there is provided a screen system kit comprising the screen system of the second aspect provided as a kit in which the cord is pre-tensioned and the axle pulley is locked by the locking mechanism.

According to a fourth aspect, there is provided a method of installing a screen system of the second aspect, wherein the cord is pre-tensioned and the axle pulley is locked by the locking mechanism comprising:

forming a frame by connecting the top frame member to each corner bracket, connecting the side frame member assemblies to each of the corner brackets and to the distal frame member;

insertion of the roller tube into the front of the frame by inserting each end of the roller tube into a matching slot in each corner bracket;

removing the second end of the cord from the side frame member and attaching the second end to the distal end of the screen to complete a cord drive circuit; and releasing the locking mechanism.

In a further form the method further comprises:

pre-tensioning the helical spring prior to insertion of the roller tube into each slot in each corner bracket.

According to a fifth aspect there is provided a screen system comprising:

a top frame member;

a roller tube housing a tubular motor and a drive wheel within an interior cavity of the roller tube, wherein a distal end of the tubular motor comprises a spindle which passes through the drive wheel, and the drive wheel is locked to the roller tube such that rotation of the spindle drives rotation of the roller tube, and a proximal end of the tubular motor is connected to a motor head with a plurality of electrical contacts on a proximal face wherein at least two of the plurality of electrical contacts are connected to a battery located in the tubular motor, and a proximal end of the roller tube comprises a crown wheel located over the motor head and locked to the roller tube and mounted such that the crown wheel can rotate with respect to the motor head, and at least one locking projection is formed on a proximal surface of the crown wheel;

an antenna is connected to the tubular motor wherein in use, the tubular motor is configured to drive rotation of the spindle in response to receiving a drive command from a remote controller via the antenna;

a screen wound onto the roller tube; and a corner bracket comprising a roller tube support structure comprising a central support and a slot wherein the slot comprises a slot opening, a central section, and at least one receiving cavity opposite the slot opening, and the central support is configured to form the central section of the slot, and a face of the central support located in the central section of the slot comprises a plurality of electrical spring contacts which are connected to a power connector provided in an external surface of the corner bracket, wherein, in use, the roller tube is inserted into the slot and the at least one receiving cavity receives the at least one locking projection located on proximal surface of the crown wheel, and the electrical spring contacts provide an electrical connection to the electrical contacts such that the battery can be charged by power provided by the power connector.

BRIEF DESCRIPTION OF DRAWINGS

Embodiments of the present disclosure will be discussed with reference to the accompanying drawings wherein:

FIG. 6A is an inner side view of a corner bracket according to an embodiment;

FIG. 6N is a view of detail G of FIG. 6J;

FIG. 8E is a side sectional view of the tubular motor assembled in a corner bracket assembly according to an embodiment;

FIG. 8F is a magnified view of feature B in FIG. 8E according to an embodiment; and FIG. 8G is an end perspective view of the tubular motor assembled in the corner bracket assembly according to an embodiment.

DESCRIPTION OF EMBODIMENTS

Figure 1A:
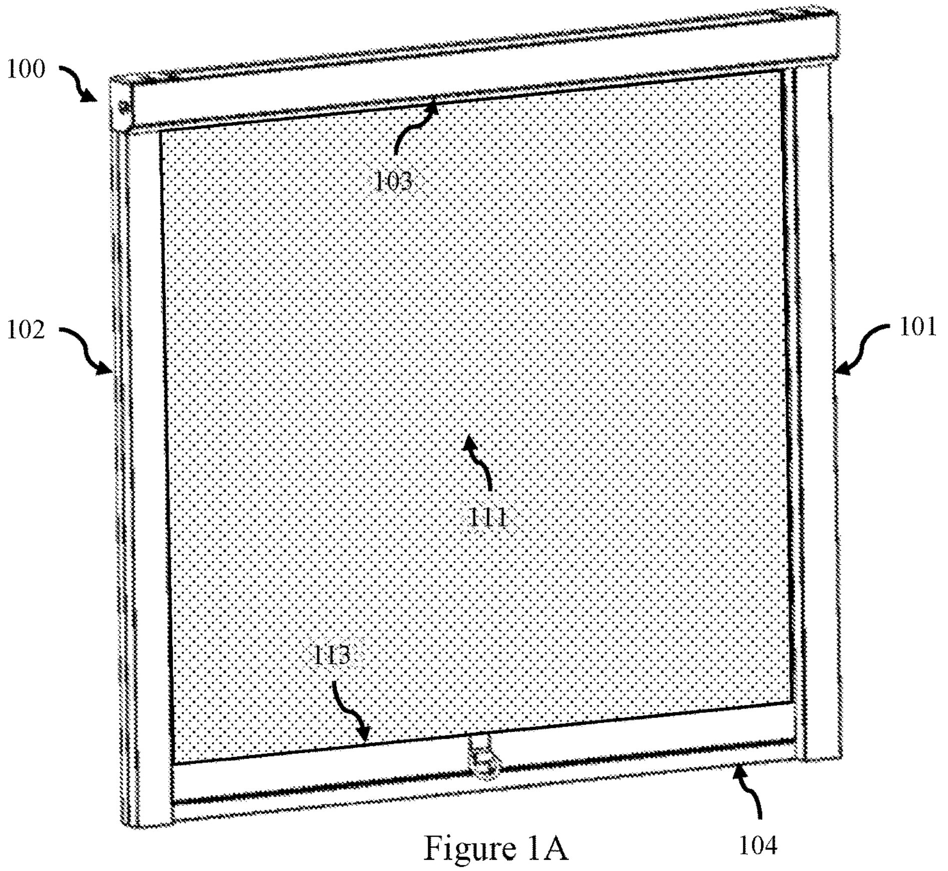
FIG. 1A is a perspective view of a roller screen system according to an embodiment.
Figure 1B:
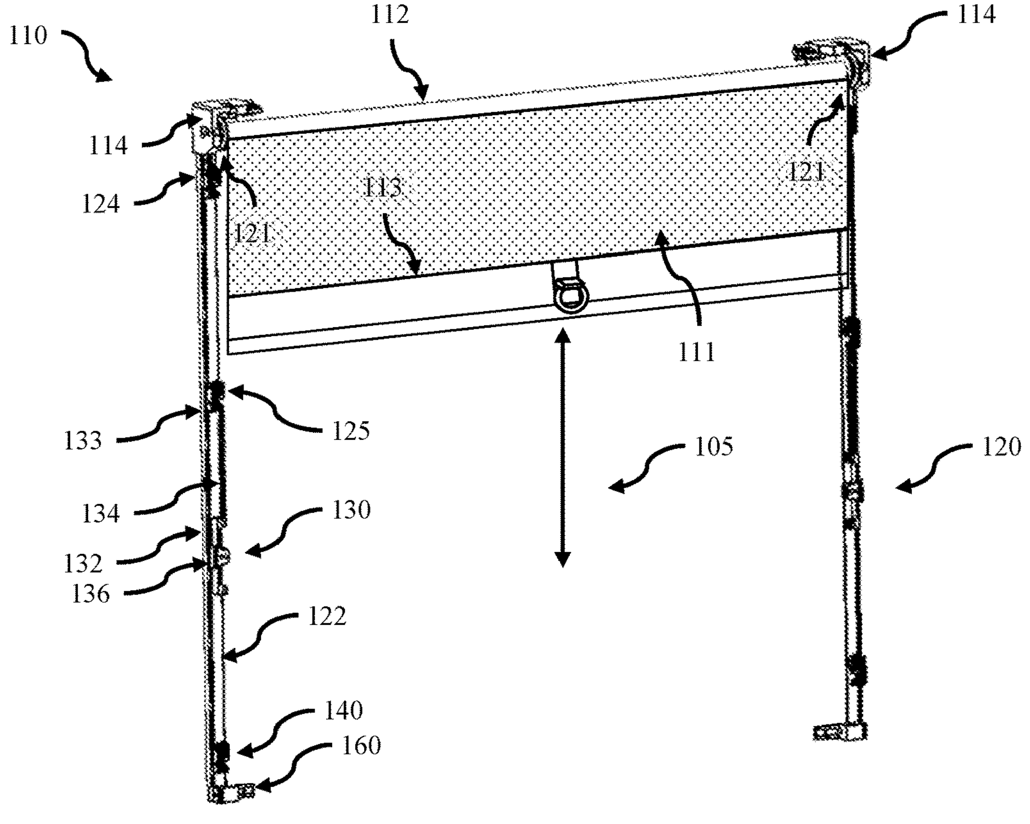
FIG. 1B is a perspective view of the roller screen system of FIG. 1A with exterior cover members removed to show internal components.

FIG. 1A is a perspective view of a roller screen system 100 according to an embodiment. Embodiments of this system may be retrofitted to existing window frames to provide retractable screens and blinds, such as blockout blinds. The system 100 is comprised of a screen frame 106 comprising a first side frame member 102, a second side frame member 102, a top frame member 103, and a distal frame member 104 with the screen 111 extended across a screen opening 105. The screen 111 may be extended and retracted across the screen opening 105 by grasping and moving the distal end 113 of the screen using a hand. FIG. 1B is a perspective view of the screen assembly of FIG. 1A with the screen 111 in a partially extended location and with exterior frame cover members removed to show the roller tube 112, screen 111, corner support brackets 114 and cord tensioning system 120 which is substantially housed within side frame members (either in one side frame member or in both side frame members 102 and 103).

Figure 1D:
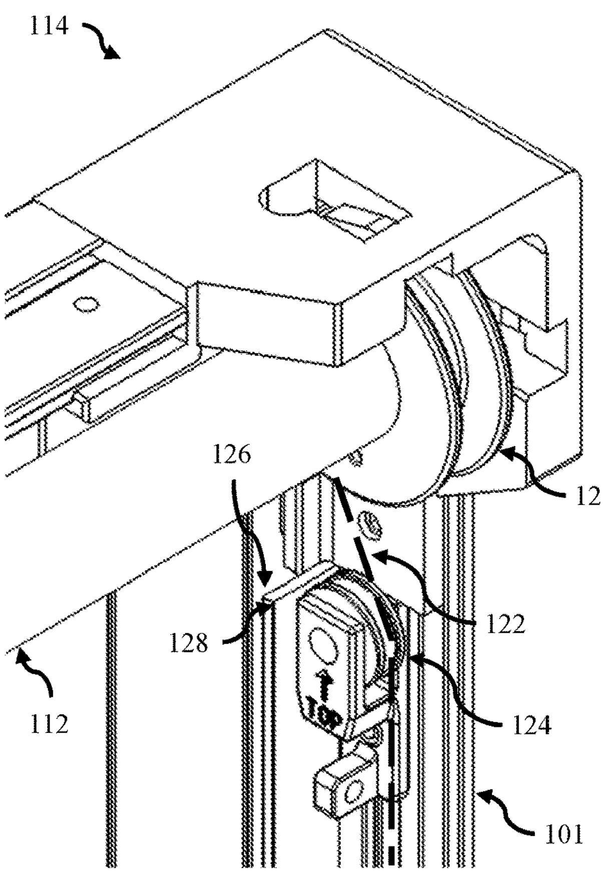
FIG. 1D is a first perspective view of the upper right corner of the retrofitable screen system of FIG. 1B illustrating the roller assembly, inner wall and first guide projection.
Figure 1E:
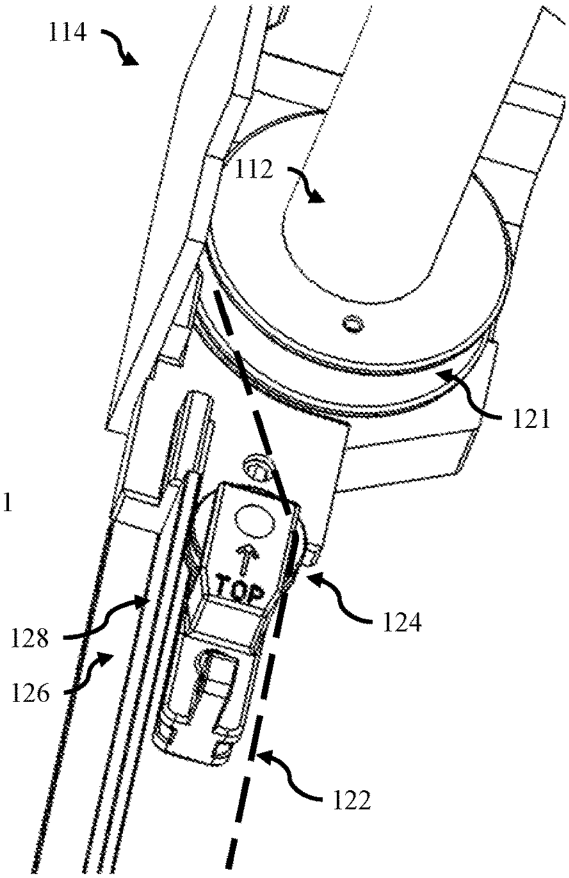
FIG. 1E is a second perspective view of the upper right corner of the retrofitable screen system of FIG. 1B illustrating the roller assembly, inner wall and first guide projection.
Figure 1C:
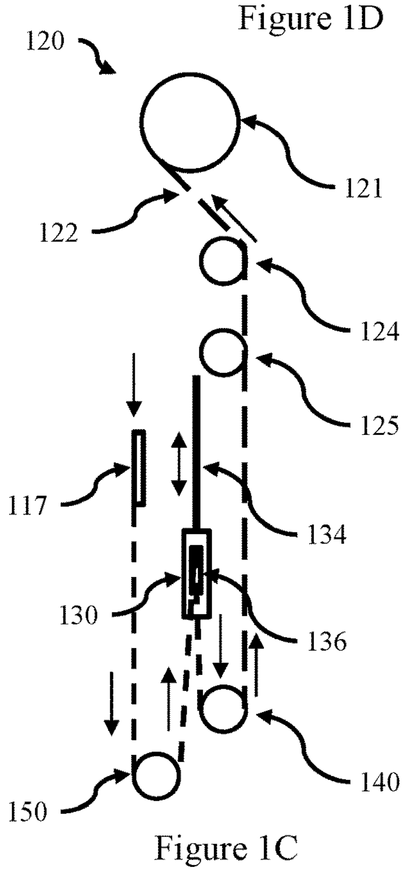
FIG. 1C is a schematic view of a cord tensioning system illustrating a cord circuit according to an embodiment.

FIG. 1C is a schematic diagram of a cord tensioning system 120 according to an embodiment that comprises a cord 122 which is wound onto or off an axle pulley 121 which in use is connected to the roller tube, and which follows a cord circuit defined by first guide pulley 124, second guide pulley 125, third guide pulley 140, central pulley 136, fifth guide pulley 150 and terminates at the distal end of the screen 113. The central pulley 136 is mounted on a tension adjustment arrangement 130 which further includes a spring 134 which is fixed to the side frame (for example by second pulley 125).

Figure 1F:
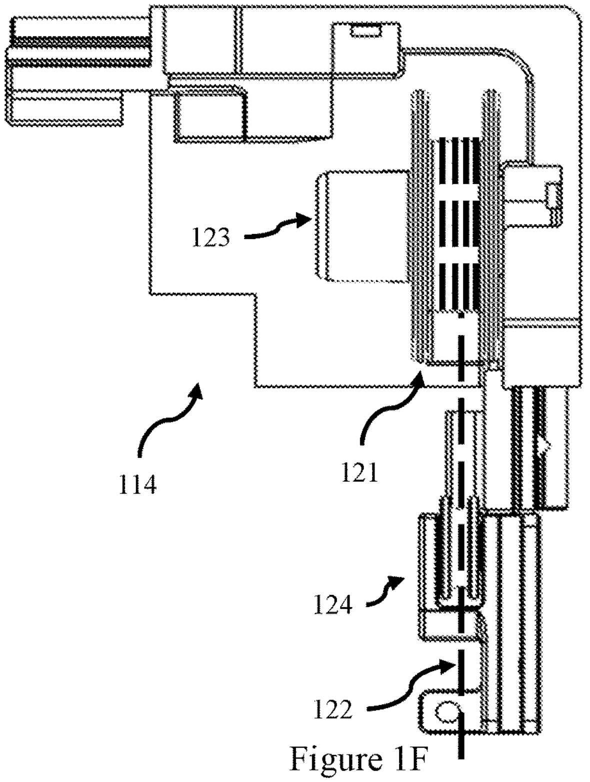
FIG. 1F is a front view of the upper right corner of the retrofitable screen system of FIG. 1B illustrating the roller assembly, inner wall and first guide pulley.
Figures 1G, 1H, 1I:
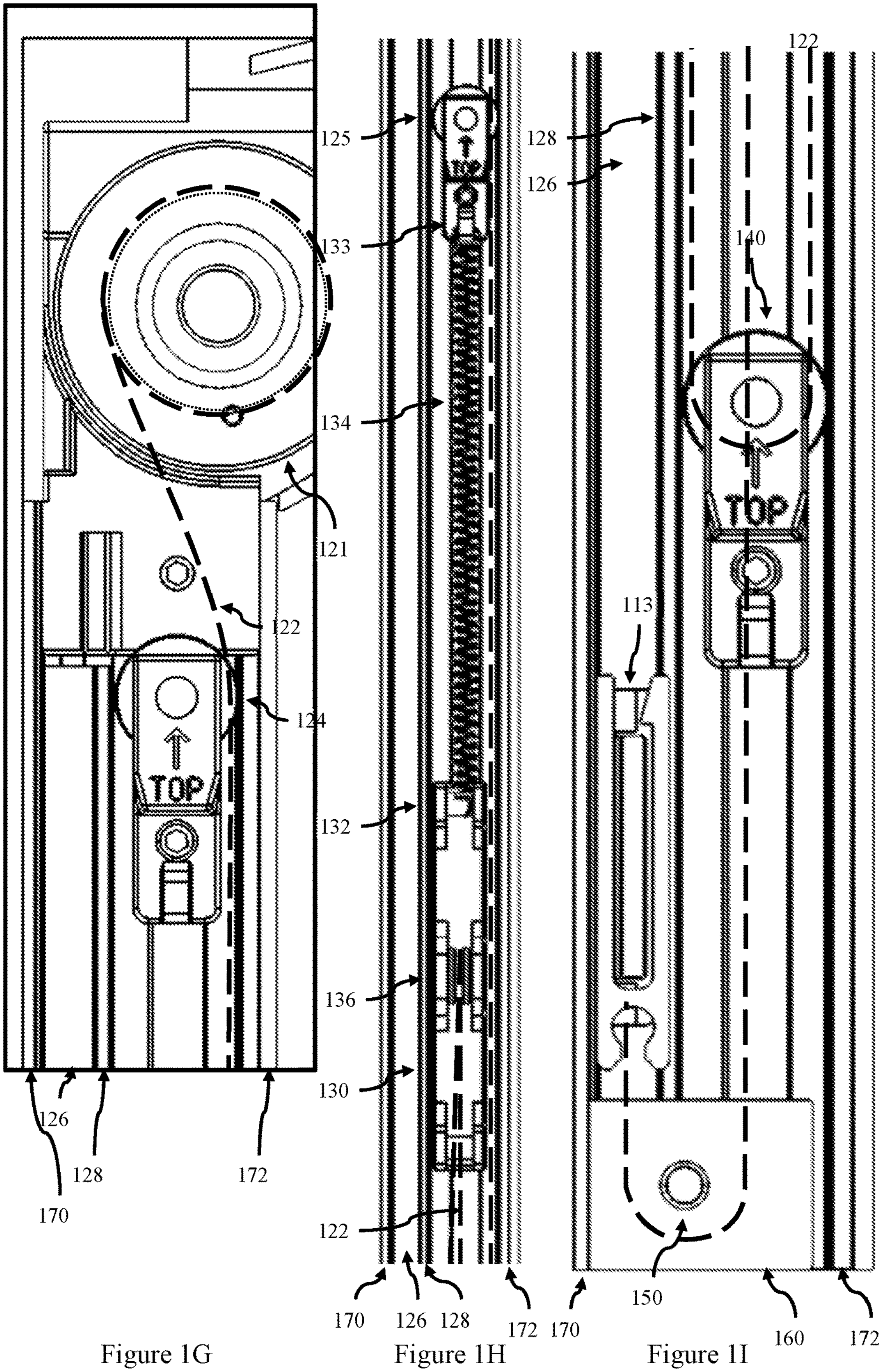
FIG. 1G is a side view of the upper right portion of the retrofitable screen system of FIG. 1B illustrating the roller assembly, inner wall and first guide pulley according to an embodiment.
FIG. 1H is a side view of the middle right portion of the retrofitable screen system of FIG. 1B illustrating the second guide pulley, the spring and the tension adjustment arrangement.
FIG. 1I is a side view of the lower right portion of the retrofitable screen system of FIG. 1B illustrating the third pulley, fourth pulley, inner wall and distal edge of the screen.
Figure 1J:
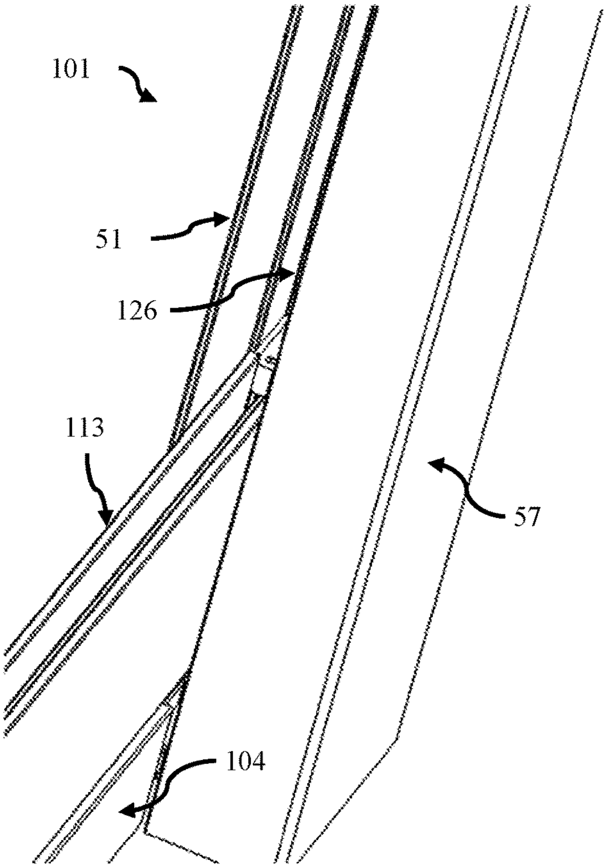
FIG. 1J is a first perspective view of the lower right corner of the retrofitable screen system of FIG. 1B.
Figure 1K:
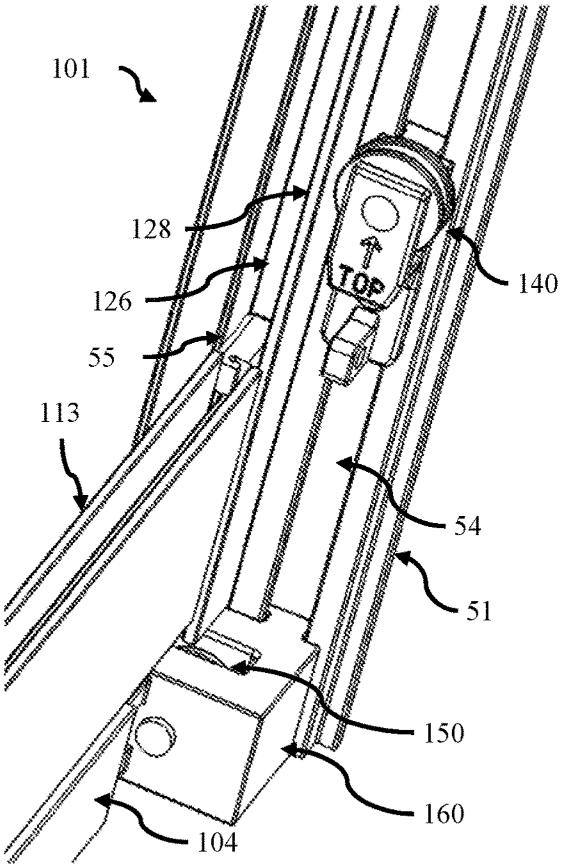
FIG. 1K is a second perspective view of the lower right corner of the retrofitable screen system of FIG. 1B with the cover of side frame member 102 removed.

FIGS. 1D to 1K illustrate a prior art retrofitable retractable screen system described in PCT/AU2015/000436 published as WO 2016/015084. FIGS. 1D and 1E are first and second perspective views, and FIG. 1F is a front view of the upper right corner, and FIGS. 1G, 1H and 1I are side views of the upper, middle and lower right portion of the retrofitable screen system of FIGS. 1A and 1B. In this embodiment the ends of the roller tube 112 which support the screen 111 comprise a spindle 121, or axle pulley onto which cord 122 is wound. The spindle 121 includes projection 123 which supports the roller tube. The corner bracket 114 is configured to house and mount the roller tube via a spindle receiving cavity that receives the spindle 121 of the roller tube 112. The cord tensioning system 120 guides the cord 122 via a first fixed guide pulley 124 proximal to the corner bracket 120, a second fixed guide pulley 125, and around a third fixed guide pulley 140 located proximal to the lower corner bracket 160. The third fixed guide pulley redirects the cord 122 toward the tension adjustment arrangement 130 which comprises a body which supports a central pulley 136 with a spring anchor 132 at the upper end which connects a spring 134 to a spring anchor 133 on the second fixed guide pulley 125. The cord is directed from the third fixed guide pulley 140 around the central pulley 136 which has an axis orthogonal to the axis of the third fixed guide pulley 140, and then the cord is directed around a fixed fifth guide pulley 150 where it is attached to the distal end 113 of the screen. The side panel comprises a first outer wall 170, a second outer wall 172 and an inner wall 128. The inner wall which forms a guide channel 126 with first outer wall 170 to guide (and confine) the ends of the distal end of the screen 117. The tension adjustment arrangement is confined between inner wall 128 and second outer wall 172 and as the screen is extended and retracted moves vertically to compensate for the change in cord tension.

An issue with the system illustrated in FIGS. 1D to 1K is that the frame and cord tensioning system must be fully assembled on site and then inserted into an existing window cavity frame. Assembly is technically challenging and thus requires a trained installer. Further the assembled frame includes the roller tube and is thus top heavy, making installation difficult and making the corner bracket vulnerable to damage during installation.

Thus to further improve upon this system, embodiments will now be described which simplify installation of a screen system thus avoiding or mitigating the need for a trained installer and enabling Do-It-Yourself (DIY) installation by the owner/purchaser.

In a first embodiment a corner bracket and side frame assembly has been designed with a controlled/lockable separation point between the roller tube 112 and the cord tensioning system 120 (which is substantially housed within the side frame member). In this embodiment the axle pulley 121 (spindle pulley or cord pulley) is removed and separated from the roller tube 112, and instead is integrated into the corner bracket assembly 114, whilst being fully contained by the bracket to prevent the cord from coming off the pulley. The corner bracket was also redesigned to allow front-only insertion of the roller tube. The combination of a controlled/lockable separation point between the roller tube and upper frame member 103 and redesign of the corner bracket 114 to allow insertion of the roller tube from the front enables the system to be shipped in a kit form with the cord tensioning system preassembled and tensioned. A locking mechanism holds the cord (and tension) in place during shipping and installation. The redesign of the corner bracket to allow front-only insertion of the roller tube provides additional space in the corner bracket to fit a strong locking mechanism capable of retaining the rotation of the axle pulley 121 at beyond maximum cord tension.

This combination of features simplifies the installation and allows the installer to easily assemble the frame (including the cord tensioning system) into the window frame without the roller tube 112. The roller tube can then be separately slotted into the corner brackets of the frame and the lock released. Several additional improvements have also been made to the system which are described below and illustrated in the accompanying drawings.

Figure 2C:
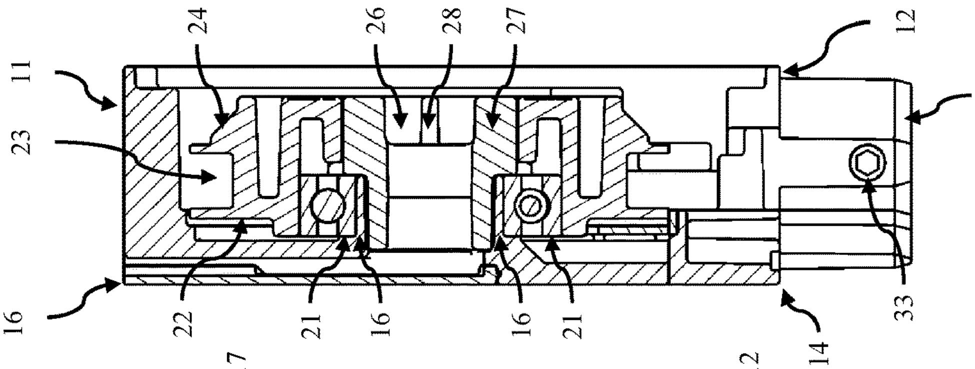
FIG. 2C is a section view through section A-A of FIG. 2B according to an embodiment.
Figure 2B:
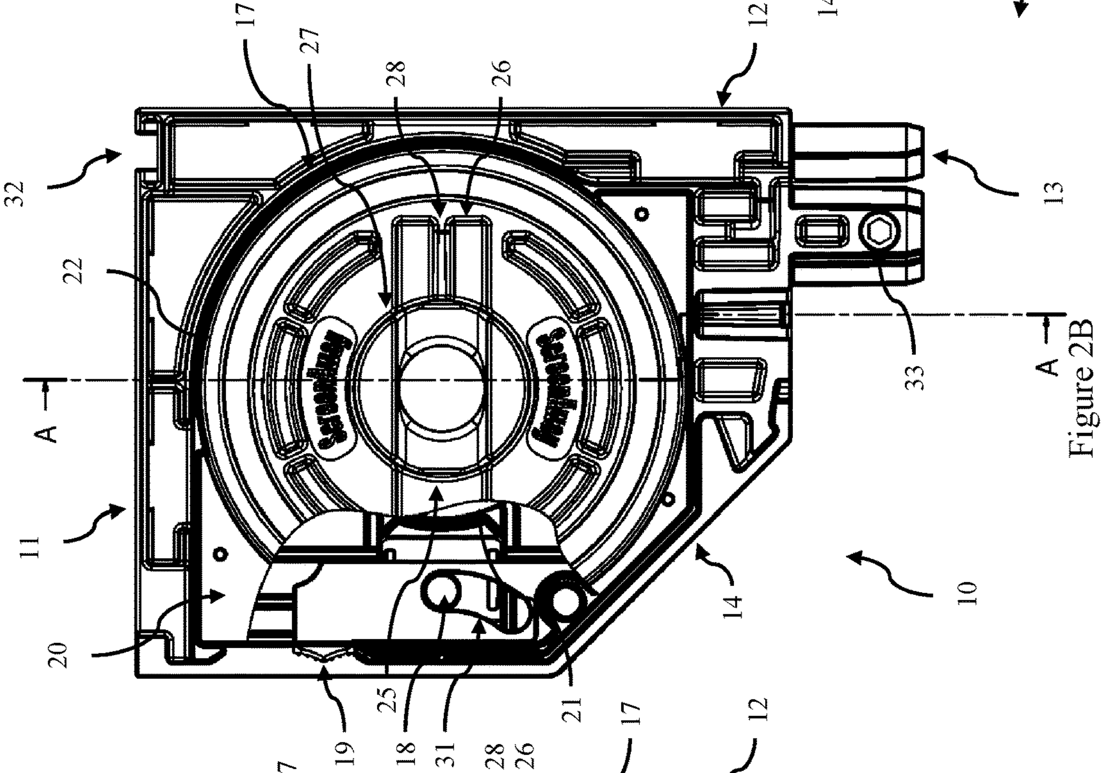
FIG. 2B is a front view of a corner bracket according to an embodiment.
Figure 2A:
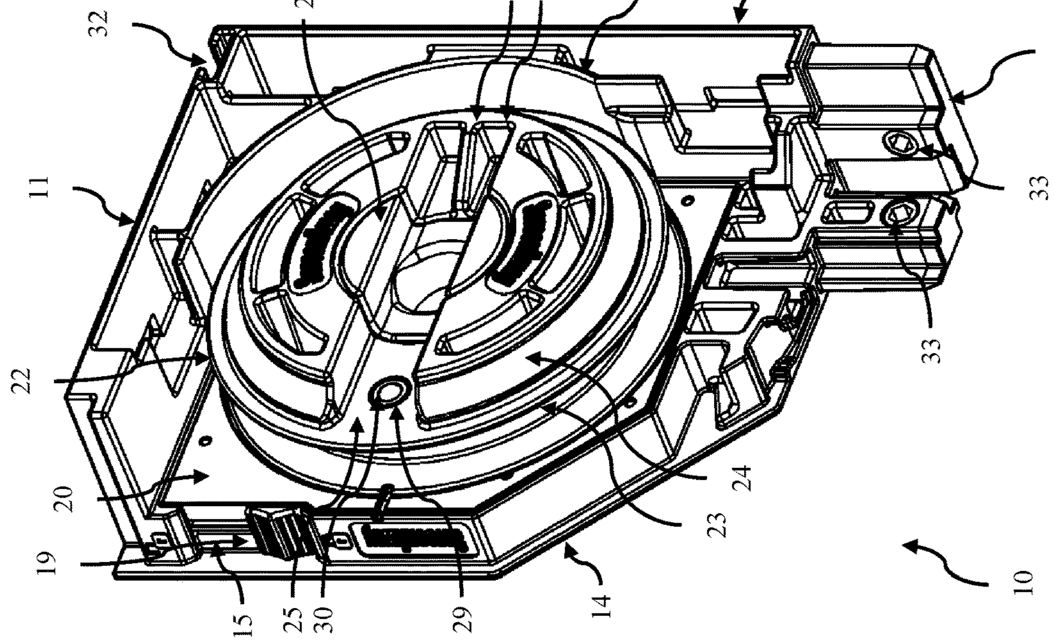
FIG. 2A is a perspective view of a corner bracket according to an embodiment.
Figure 2D:
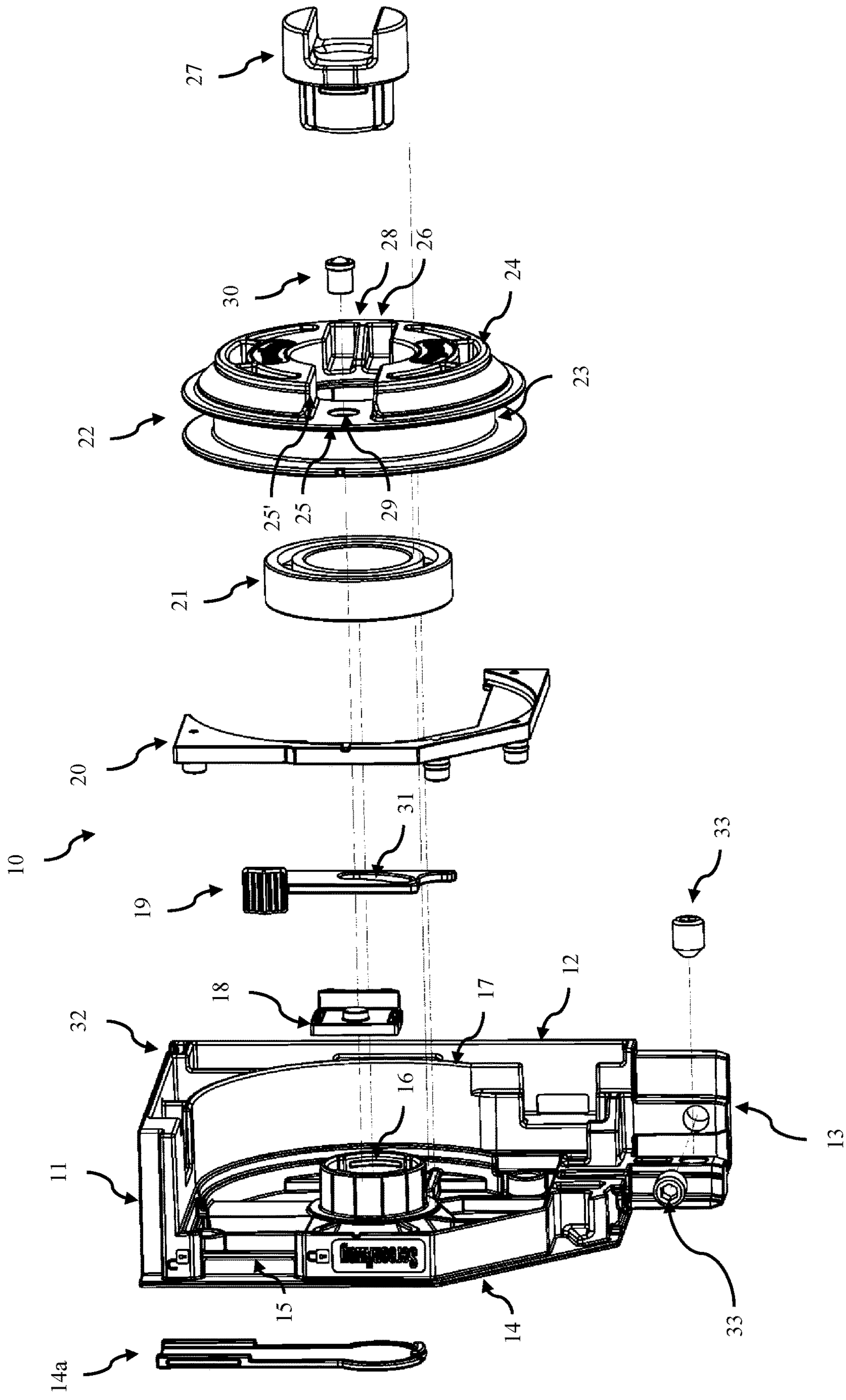
FIG. 2D is an exploded view of a corner bracket according to an embodiment.

An embodiment of a corner bracket 10 is illustrated in FIGS. 2A to 2F. FIGS. 2A and 2B are a perspective and front view of a corner bracket according to an embodiment. FIG. 2C is a section view through section A-A of FIG. 2B according to an embodiment and FIG. 2D is an exploded view of a corner bracket according to an embodiment. The corner bracket 10 includes a lockable encapsulated axle pulley 22 which houses one end of a length of cord 122, with the free end secured to the side bracket. A cord locking mechanism is used to lock the encapsulated axle pulley and prevent unwinding of the cord, or loss of tension. During installation the free end is attached to the distal end of the screen 113 after which the lock may be released. The corner bracket shown in FIGS. 2A to 2F may be used with the side frame members illustrated in FIGS. 1D to 1I, and as illustrated in PCT/AU2015/000436 the entire content of which is hereby included by reference. In FIGS. 2A to 2F the cord 122 has been omitted for clarity.

The corner bracket 10 is connected to the side frame member and is configured to act as a roller tube support. The corner bracket is configured to mount and encapsulate an axle pulley 22, and comprises a top wall 11, a rear wall 12 and a side wall 14. An internal curved wall 17 is provided to encapsulate the axle pulley 22. A mounting projection 16 is located on the side wall and extends inward to form a support surface for a ball bearing 21 which supports an axle pulley 22 with channel 23 around which the cord 122 is wound. The channel 23 may comprise a fixing point to fix one end of the cord 122 to the axle pulley (see apertures in channel 23 in FIG. 2F). The lower portion of rear wall 12 and side wall 14 comprises attachment projections 13 which are received in the top of the side frame member 102 to allow attachment of the corner bracket to the side frame member. A pair of (orthogonal) grub screws 33 are used to secure the corner bracket to the side frame member. Side wall 14 further comprises an optional cable cover 14*a* (for use with motorised drive systems).

The inner side (i.e. distal of the side wall 13) of the axle pulley 22 comprises a roller tube support structure 24. The roller tube support is a substantially annular structure with a central aperture which receives a torque stub 27. The torque stub 27 passes through a central aperture in the axle pulley 22 and is received within and on the mounting projection 16. The torque stub is formed with a central aperture and the outer wall is formed to create a proximal wall section and a distal flange section. The proximal wall section is received within mounting projection 16 and the proximal surface of the distal flange section extends over and rests upon the outer surface of the mounting projection and partially extends over the distal wall of the ball bearing 21 as shown in FIG. 2C.

Figure 2E:
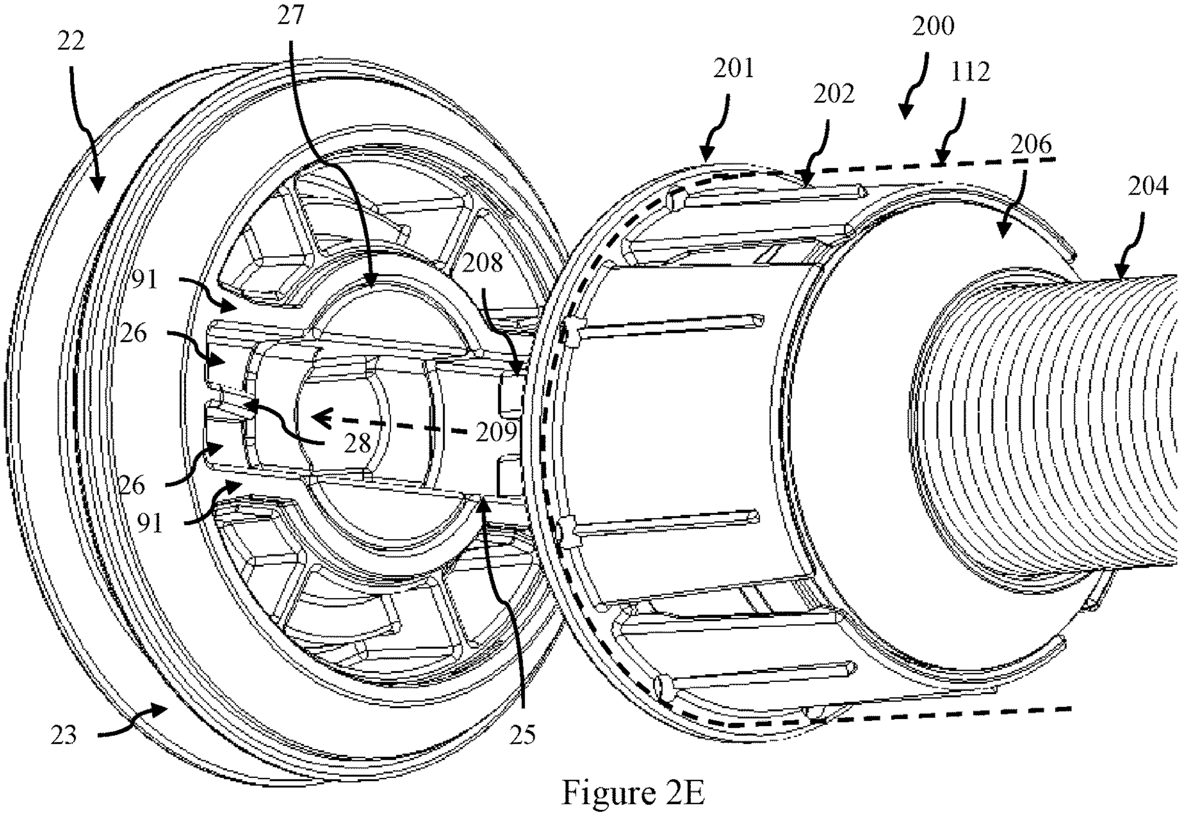
FIG. 2E shows the roller tube and a spring assist mechanism being slotted into the axle pulley of the corner bracket according to an embodiment.
Figure 2F:
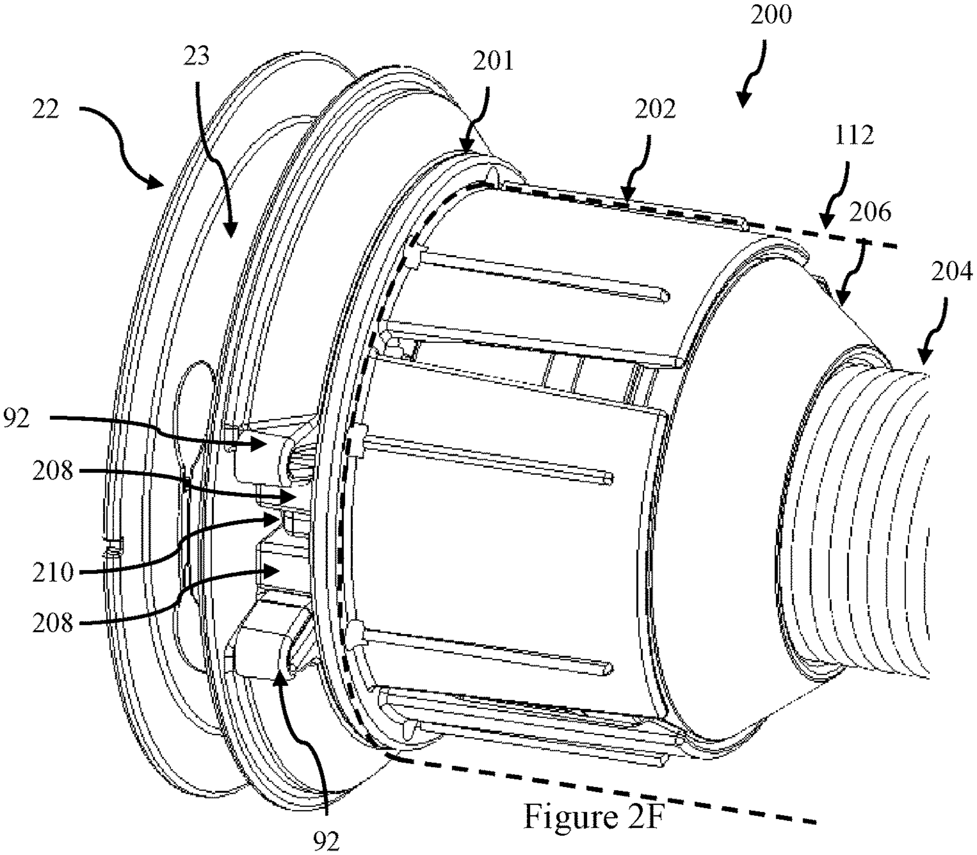
FIG. 2F shows the roller tube and a spring assist mechanism slotted into the axle pulley of the corner bracket according to an embodiment.
Figure 2G:
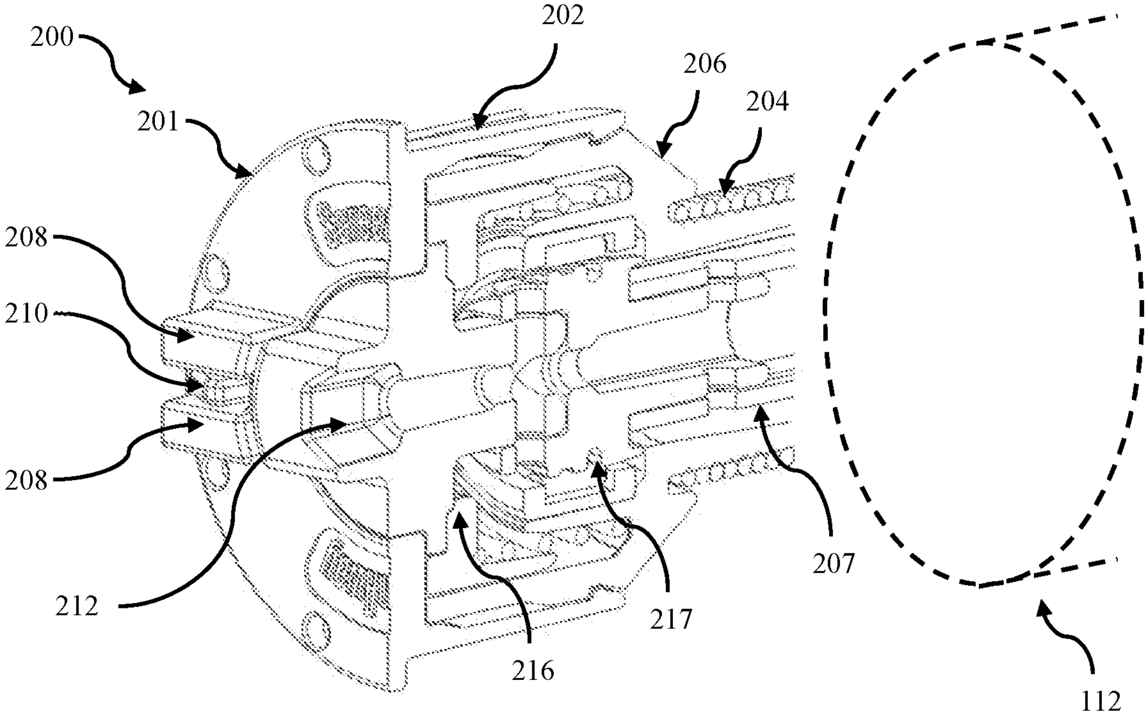
FIG. 2G shows a perspective sectional view of the end surface of a spring assist mechanism fitted in a roller tube according to an embodiment.

The roller tube support structure on axle pulley 22 comprises a slot 25 formed from a slot opening 25' at one end, and opposite the slot opening 25' is a pair of receiving cavities 26 separated by a wedge 28. The middle section of slot 25 is formed by the distal flange section of the torque stub which is formed with a matching slot. In some embodiments a central support similar in function and configuration to the torque stub 27 may be used in place of the torque stub, such as support having a distal flange section which forms the central section of the slot. Together these form the slot 25 in the roller tube support structure to allow front insertion of the roller tube 112. As shown in FIGS. 2E to 2G, the end surface 201 of the roller tube 112 is configured with two pairs of locking projections 208, each pair located on opposite sides of the end surface 201 (e.g. 180° apart) such that the roller tube 112 can be slid (dashed arrow 209) into the slot of the roller tube support structure through the slot opening 25' until one pair of the locking projections 208 are received in the pair of receiving cavities 26, and the other pair of locking projections 208 are located in the slot opening 25' to lock the roller tube in place on the roller tube support structure. Rotation of the axle pulley 22 will then cause rotation of the roller tube 112. This arrangement thus allows front insertion of the roller tube 112 into the slot of the corner bracket after the corner bracket has been attached to the frame and inserted into the window frame.

In one embodiment a spring assist mechanism 200 may be used with the roller tube 112. FIG. 2E shows the roller tube and a spring assist mechanism 200 being slotted into the axle pulley of the corner bracket according to an embodiment and FIG. 2F shows the roller tube 112 and a spring assist mechanism 200 slotted into the axle pulley of the corner bracket according to an embodiment. FIG. 2G shows a perspective sectional view of the end surface 201 of the spring assist mechanism 200 fitted in a roller tube according to an embodiment. In the embodiment shown in FIGS. 2E to 2H the roller tube 112, shown as dashed lines, includes or houses an internal spring assist mechanism 200 in which a helical wound spring 204 is located within the roller tube. One end of the spring is fixed whilst the other is locked to the roller tube so that the spring tension acts as a counterbalance against the weight of the screen when it is unwound from or wound onto the roller tube 112. In this embodiment the spring assist mechanism 200 is inserted into and forms one end of the roller tube 112 and comprises an end surface 201 with an annular support structure 202 which is inserted into the end of the roller tube 112. Annular support structure 202 engages with an internal annular support structure 206 to which one end of the spring 204 is fixed. The internal annular support structure 206 receives shaft 207 on which the spring 204 is supported. The distal end of the spring 204 is connected to an end cap on the shaft 207 (not shown) which is keyed to the roller tube 112 so the end cap rotates with roller tube 112. The internal annular support structure 206 can rotate with respect to the shaft so that the helical spring 204 can be pre-tensioned via a ratchet mechanism 216 prior to insertion into the roller tube (or axle pulley) by a key which is inserted into key aperture 212 of torque shaft. The torque shaft is connected to (and drives) joiner 217, the distal end of which is inserted into the shaft 207, and the proximal end supports a ball bearing that supports the internal annular support structure 206. The key drives rotation of the torque shaft and joiner 217 with respect to internal annular support structure 206 to tension the spring. A compression spring provides constant tension to a ratchet mechanism 216 to ensure that any added tension is retained when the key is removed. The ratchet mechanism 216 comprises a ratchet disengaging projection 210 located between the locking projections 208, such that when the roller tube 112 is inserted into the axle pulley 22, the wedge 28 depresses the ratchet disengaging projection 210 to disengage the ratchet mechanism 216 to prevent further adjustment of the spring tension. With the ratchet disengaging projection 208 disengaged rotation of the axle pulley 22 and roller tube 112 will wind (or unwind) one end of the torsion spring relative to a fixed point to counter balance the changing weight of the screen. Further details of a spring assist are described in PCT/AU2021/000022, the entire content of which is hereby included by reference.

In other embodiments the spring assist mechanism may be omitted. In these embodiments the end surface 201 of the roller tube 112 will still be configured with a pair of locking projections 208 to allow the tube to be inserted into the axle pulley via the slot such that one of the locking projections 208 will be received in the receiving cavity 26. Note in this embodiment the wedge 28 may be omitted and a single receiving cavity 26 may be used, and the locking projection 208 may be a solid projection rather than a pair of projections. In some embodiments a tube adapter comprising the pair of locking projections 208 may be fitted onto the end of a roller tube 112.

The corner bracket 10 further comprises a locking mechanism to allow locking of the axle pulley 22. This locking mechanism is strong enough to prevent rotation of the axle pulley 22 when the cord is fully tensioned. This allows the cord 122 to be wound through the cord tensioning system 120 (i.e. the cord circuit shown in FIG. 1C) at the factory, tensioned and locked so that the cord will not move or lose minimal tension during shipping and installation. In some embodiments the cord is retained in the cord circuit but is under minimal tension (loose; but prevented from derailing) and during installation tension is applied, such as by adjustment of cord pulley locations. This significantly reduces the installation time and technical difficulty of the installation.

The locking mechanism comprises a locking wedge 18 comprising a wedge portion and a distally directed lock projection. The locking wedge is located in a channel formed in the side wall 14 of the roller tube support bracket 10. A lock slide 19 comprises a slider connected to an (orthogonal) panel or plate with a curved slot 31 with a width configured to receive the distal lock projection (e.g. slightly greater than the diameter of the distal lock projection). In this embodiment the slider is a peaked block mounted orthogonally to the panel, although other arrangements could be used. For example the slider could be a lever or a knob. The panel extends through a guide slot 15 formed in a wall extending distally from the side wall 14. A lock cover 20 then covers the panel of the lock slide and locking wedge. Sliding of the lock slide along the guide slot 15 drives the distal lock projection along the curved slot path and causes the lock wedge to engage (or disengage) the axle pulley to lock or unlock the axle pulley. This is illustrated in cut-out section of FIG. 2B. The block is peaked and includes ridges to assist in sliding (pushing) the block (and slider) to lock or unlock the axle pulley 22 (i.e. peaked to allow it to be pushed/slid up or pushed/slid down).

The roller tube support bracket 10 can be assembled as follows. Lock wedge 18 is fitted into place on the roller tube support bracket 10. The lock slide 19 is fitted on top of the lock wedge 18 and in place or within the roller tube support bracket 10. Lock cover 20 is pressed into place on roller tube support bracket 10 to retain the locking mechanism. Ball bearing 21 is pressed into place on axle pulley 22. Ball plunger 30 is pressed into an aperture 29 within the axle pulley 22. Ball bearing 21, axle pulley 22, and ball plunger 30, as assembled, are pressed onto the pulley shaft of the roller tube support bracket 10. Torque stub 27 is pressed into the pulley shaft hole of the roller tube support bracket 10, axially retaining the axle pulley 22 in place, whilst allowing it to rotate freely. Cable cover 16 is pressed onto the side outer face of the roller tube support bracket 10. Two grub screws 33 are fitted to the roller tube support bracket 10. The ball plunger 30 is located within the slot opening, and engages with the inserted roller tube to provide a frictional force to assist in retaining the inserted roller tube in the slot.

A benefit of the corner bracket design described above and illustrated in FIGS. 2A to 2G is that it enables the cord tensioning system 120 to create a cord circuit that can be loaded under spring tension, prior to installation of the roller tube 112 and screen 111. This is enabled due to the lockable, encapsulated axle pulley 22, which houses one end of a length of cord 122, with the free end housed below the corner bracket 10. This allows for the frame members to be assembled (e.g. clipped together) with the corner bracket and side frame member housing the cord tensioning system 120 to form a frame. This frame can be installed in the window frame alone and prior to installation of the roller tube 112, and transfers the tedious assembly of the cord tensioning system to the manufacturer, removing it from the installer. After assembly the axle pulley 22 is locked in place, with the opening facing forward, by pushing the lock slide 19 down. This then allows the roller tube 112 to be slid in place from the front, with external projections 208 locating within the slot opening 25 accessible from the front of the axle pulley 22 until they are retained in cavities 26. The free end of the cord is then fitted to the distal end 113 (cross rail) of the screen 111 completing the cord drive circuit. Once the system is tensioned as desired and the axle pulley is unlocked, the system is free to operate.

This slot in arrangement for the roller tube 112 avoids the need to spring load the axle pulley 22. Many existing roller blinds use spring loaded axle pulleys to allow insertion of a roller tube 112 to corner brackets. However the spring load required for this smooth operation of the system (e.g. easy winding and unwinding of a block-out blind) was significant such that it made fitting/removing the fabric roll from the spring loaded axle pulleys extremely difficult. Further it required considerable additional space within the corner bracket, limiting the space available for the locking mechanism such that a suitable locking mechanism was insufficiently strong to hold the axle pulley in place under full cord tension. Embodiments of the corner brackets using a (non spring loaded) axle pulley configured to allow front-slide-in of a roller tube as illustrated in FIGS. 2A to 2F provided additional space to fit a large and strong locking mechanism, capable of retaining the rotation of the axle pulley at beyond maximum cord tension.

Figure 3C:
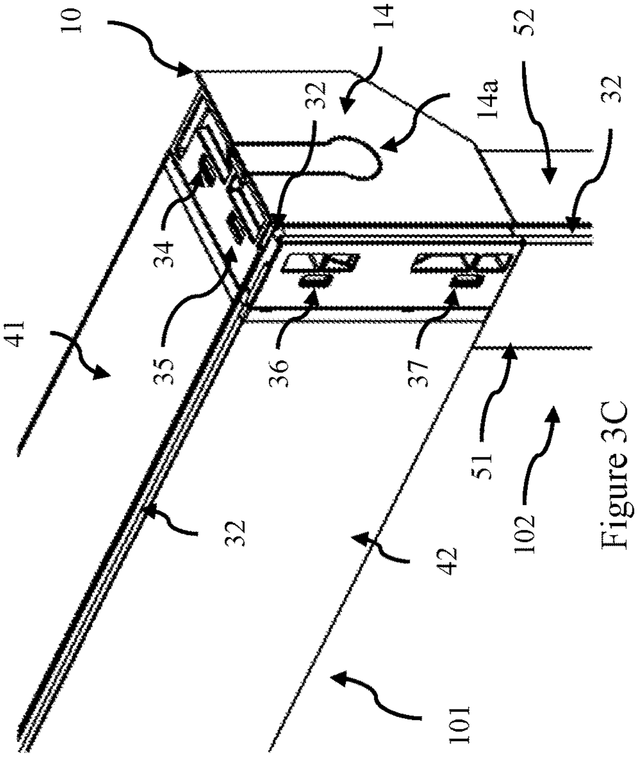
FIG. 3C shows a perspective view of the top frame member and corner bracket in a clipped configuration according to an embodiment.
Figure 3D:
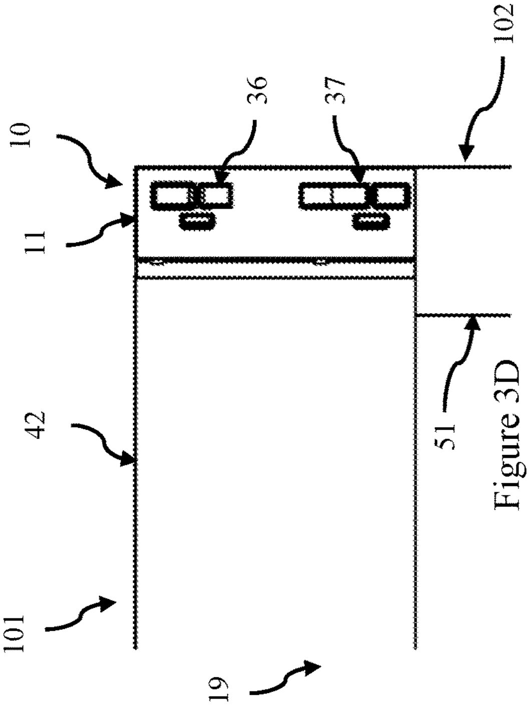
FIG. 3D shows a rear view of the top frame member and corner bracket in a clipped configuration according to an embodiment.
Figure 3A:
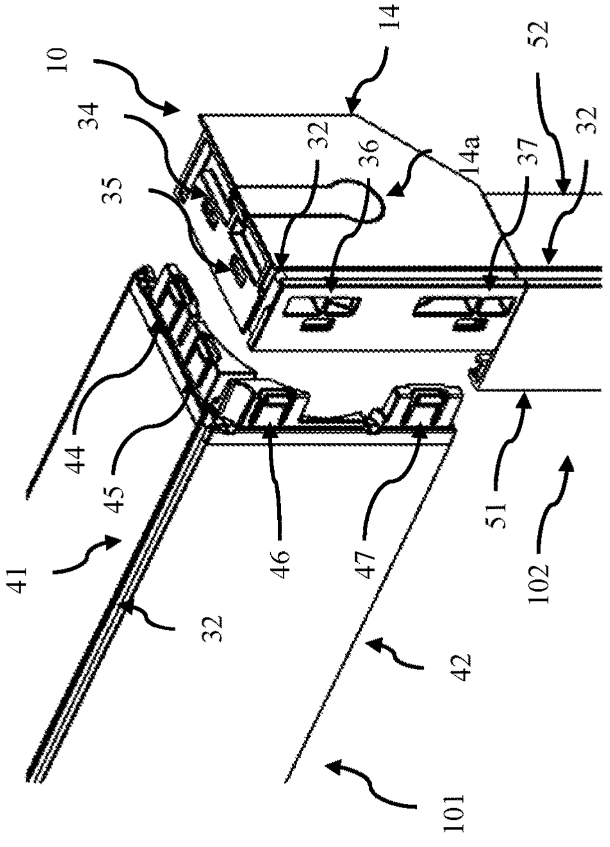
FIG. 3A shows a perspective view of the top frame member and corner bracket in an unclipped configuration according to an embodiment.
Figure 3B:
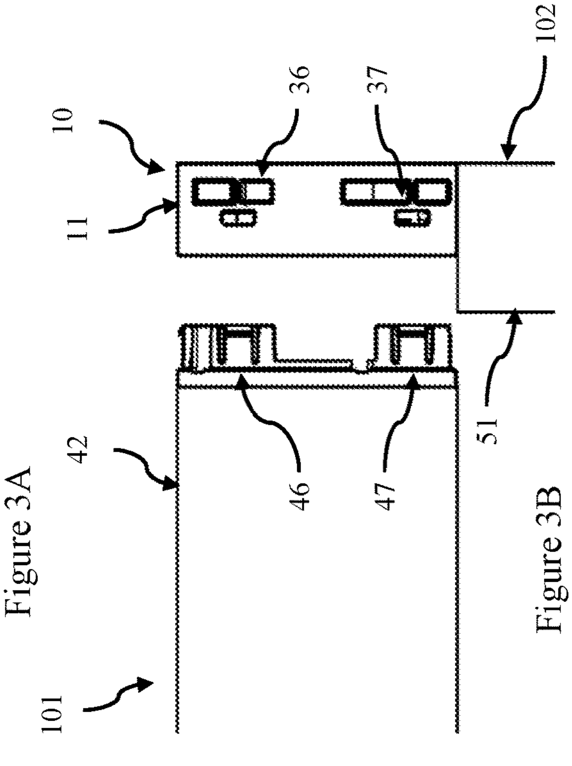
FIG. 3B shows a rear view of the top frame member and corner bracket in an unclipped configuration according to an embodiment.

To further assist the installation process, the corner bracket and both top and side frame members were designed with clips to allow simple construction of the frame. FIGS. 3A and 3B show a perspective and rear view of the top frame member 101 and corner bracket 10 in an unclipped configuration, and FIGS. 3C and 3D show a perspective and rear view of the top frame member 101 and corner bracket 10 in a clipped configuration. The top surface 11 of the corner bracket 10 comprises a pair of spaced apart clip apertures 34 and 35 and the rear surface 12 of the corner bracket 10 comprises a pair of clip apertures 36 and 37. The top surface 41 of the top frame member 101 comprises a pair of spaced apart clips 44 and 45 designed to clip into clip apertures 34 and 35 of the top surface of the corner bracket and the rear surface 42 of the top frame member 101 comprises a pair of spaced apart clips 46 and 47 designed to clip into clip apertures 36 and 37 of the rear surface of the corner bracket.

In some embodiments the screen 111 is a blockout blind designed to block out or substantially reduce the light passing through a window. In this application it is important to ensure that there is no light leakage from any gaps between the assembled screen frame and window frame. This typically requires careful installation and then insertion of sealant or other material to block out any gaps and can be time consuming during installation. Further, gaps may develop over time due to movement of the window frame requiring resealing. Thus to simplify this process the frame members are further configured (or extruded) with a perimeter track 32 extending around the entire perimeter of the frame (i.e. in each frame member) and which is configured to receive a pile seal 60 to create a perimeter light seal. Further the pile seal 60 can be fitted during manufacturing. This ensures that the perimeter of the frame is light sealed upon fitting the frame into the window frame, removing the tedious task of sealing the perimeter after installation, or using permanent options, such as silicone, to block the perimeter light gap. Previous systems typically require time consuming tracking down of any gaps in the seal, as well as having a tendency to allow light to leak though joins between frame components. The use of a complete 3600 perimeter seal enables a complete seal to be more easily obtained.

Figure 4B:
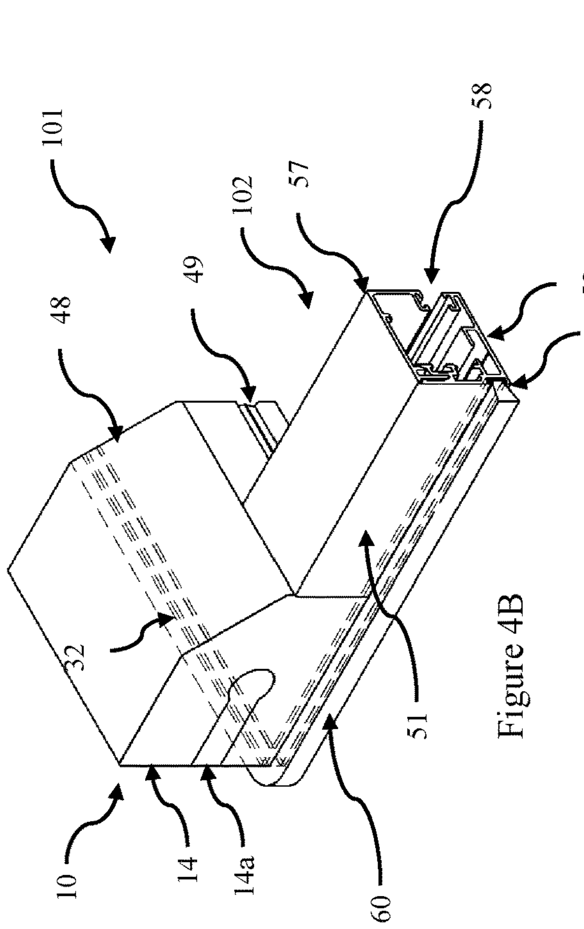
FIG. 4B is a second perspective view of a side frame member, a corner bracket and a top frame bracket with a pile seal according to an embodiment.
Figure 4E:
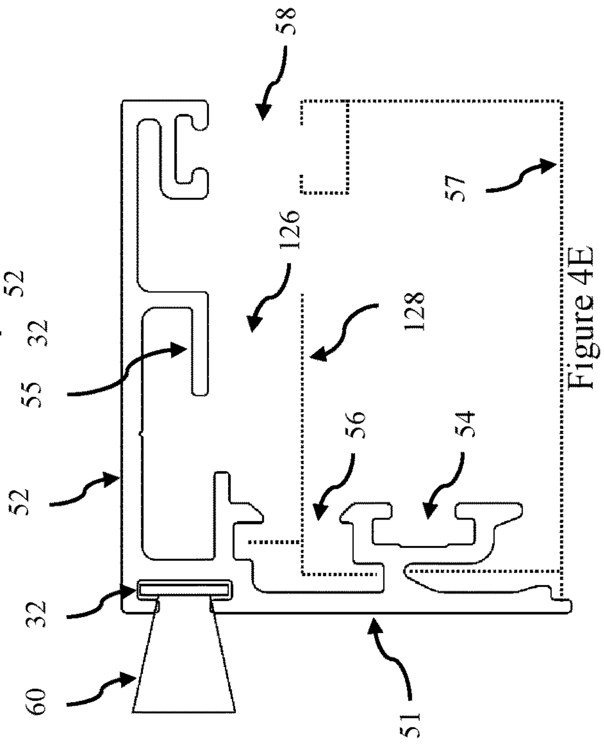
FIG. 4E is a section view of an extrusion forming part of the side frame member showing a perimeter track fitted with a pile seal according to an embodiment.
Figure 4A:
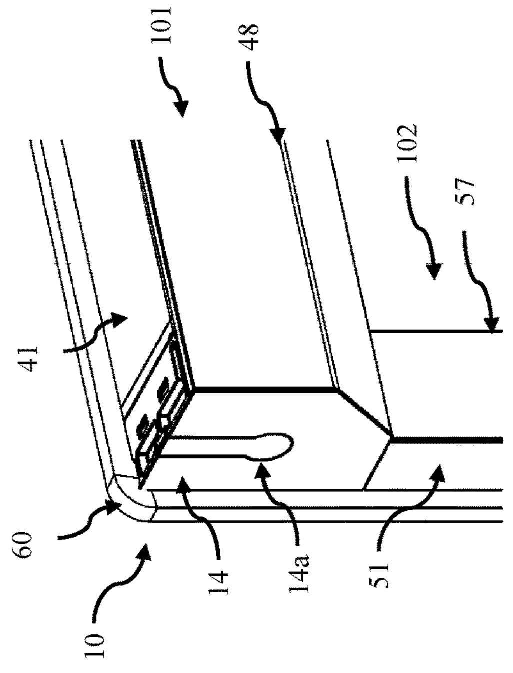
FIG. 4A is a first perspective view of a side frame member, a corner bracket and a top frame bracket with a pile seal according to an embodiment.
Figure 4D:
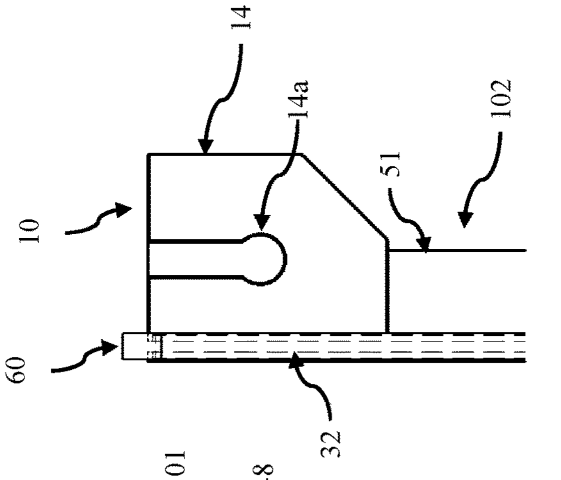
FIG. 4D is a side view of a side frame member, a corner bracket and a top frame bracket with a pile seal according to an embodiment.
Figure 4C:
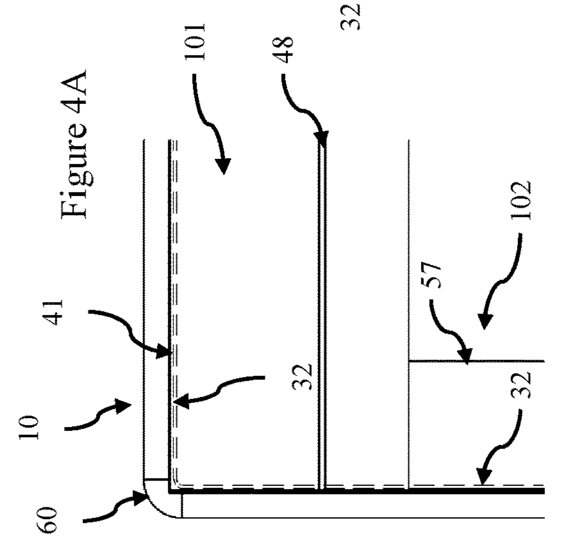
FIG. 4C is a front view of a side frame member, a corner bracket and atop frame bracket with a pile seal according to an embodiment.

The perimeter track 32 in the top, corner and side frame members is shown in FIGS. 3A to 3D and FIGS. 4A to 4E show the perimeter track with a pile seal 60 inserted into perimeter track 32. FIGS. 4A and 4B are first and second perspective views and FIGS. 4C and 4D are front and side views of a side frame member 102, a corner bracket 10 and a top frame bracket 101 with a pile seal 60 according to an embodiment. The pile seal 60 may be a woven pile using a plurality of natural or artificial (e.g. polypropylene) threads. The dashed lines show the perimeter tracks in the side frame member, corner bracket and top frame member. The side frame member 102 (or equivalently 101) is formed of a first extrusion that forms the side 51 and rear 52 of the side frame member 102 and FIG. 4E is a section view of the extrusion showing perimeter track 32 fitted with pile seal 60. A second extrusion 57 forms a front and inner side of the side frame member 102 (shown in dotted lines in FIG. 4E) and attaches adjacent slot 54 which acts as a track to support and retain cord guide pulleys 70. The guide channel 126 is formed between projection 55 of rear wall 52 and a wall 128 which slots into slot 56 of the first extrusion. A slot 58 is formed between the first and second extrusions through which the screen 111 extends.

To further assist in ensuring the cord stays in the intended location during shipping and installation the cord pulley assemblies have been redesigned to be fully set in to retain the cord even under no tension. This is also beneficial if the cord has been released while under tension, as the cord is now incapable of de-railing itself from the pulleys (which would otherwise require rethreading of the cord which is a technically difficult operation). In other embodiments, some of the pulleys could be replaced with semi-circular channels or guide tubes manufactured of low friction materials so that the cord can smoothly run through channel or tube.

Figure 5C:
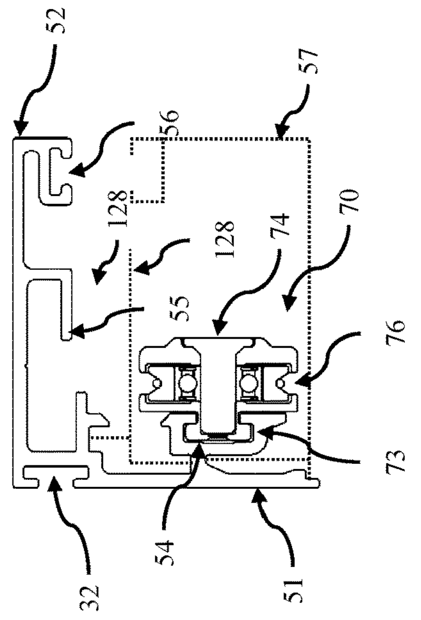
FIG. 5C shows a section view of the cord pulley in the first extrusion of the side frame member shown in FIG. 4E according to an embodiment.
Figure 5B:
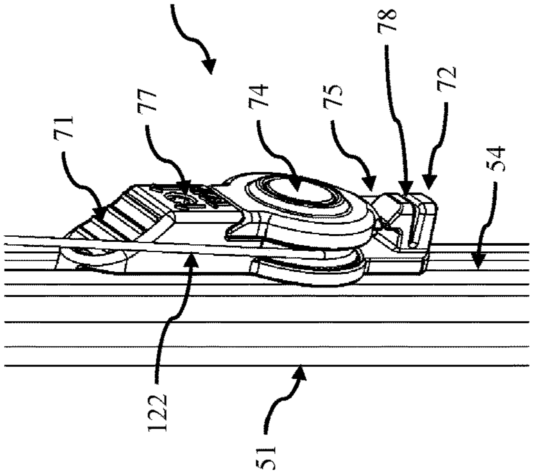
FIG. 5B is an isometric view of a pulley in the side frame member according to an embodiment.
Figure 5A:
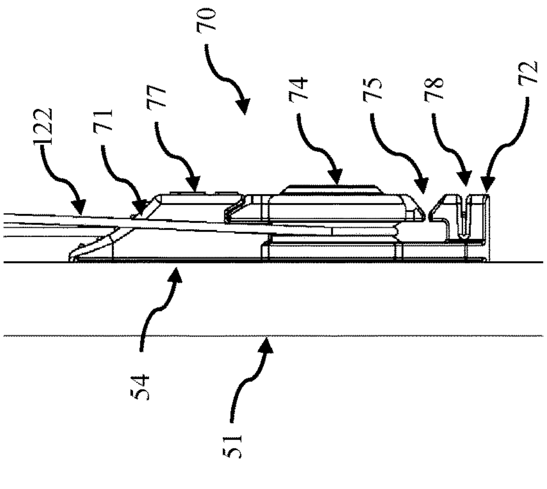
FIG. 5A is a side view of a pulley in the side frame member according to an embodiment.
Figure 5F:
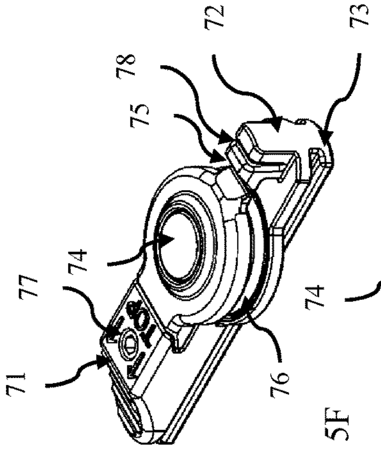
FIG. 5F is a perspective view of the cord pulley according to an embodiment.
Figure 5G:
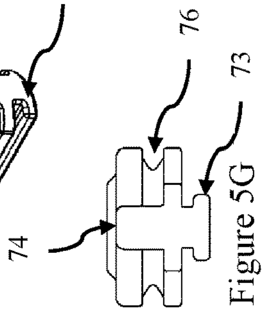
FIG. 5G is an end view of the cord pulley according to an embodiment.
Figure 5D:
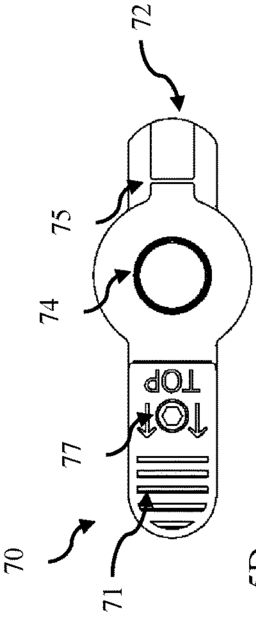
FIG. 5D is atop view of the cord pulley according to an embodiment.
Figure 5E:
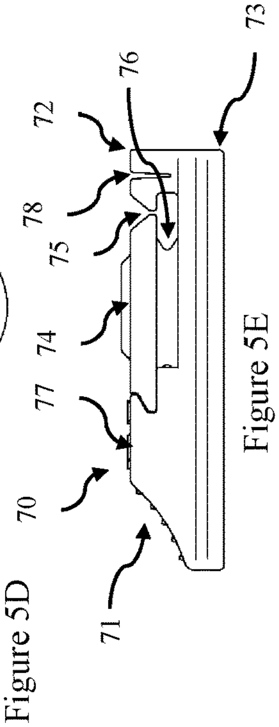
FIG. 5E is a side view of the cord pulley according to an embodiment.
Figure 5H:
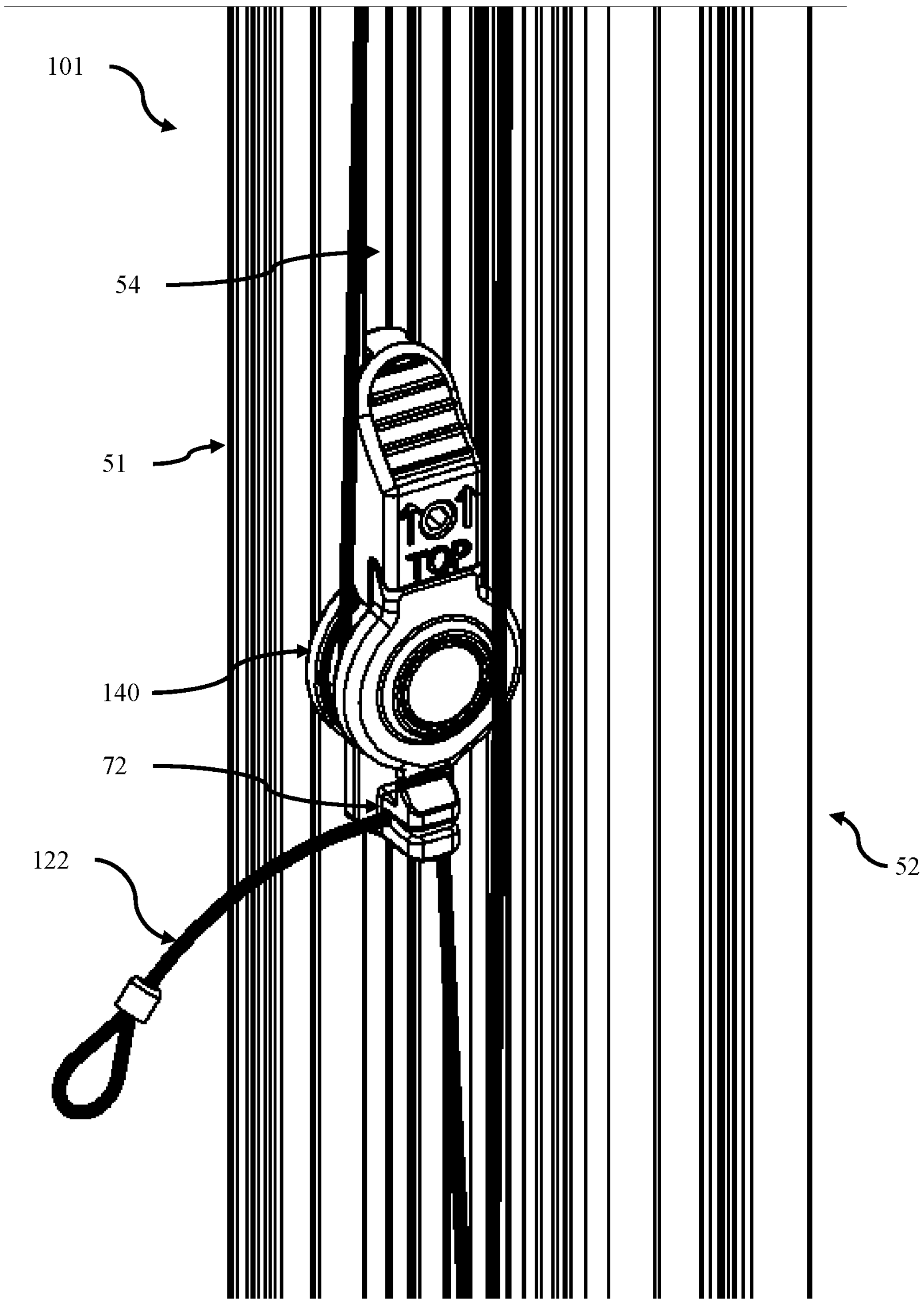
FIG. 5H is a perspective view of the third guide pulley in the side frame member in which the distal end of the cord from the fifth guide pulley is anchored in the cord retaining slot according to an embodiment.

An embodiment of a cord pulley assembly 70 is illustrated in FIGS. 5A to 5G. FIGS. 5A and 5B show a side and isometric view of a cord pulley assembly 70 in the side frame member 102 according to an embodiment. FIG. 5C shows a section view of the cord pulley assembly 70 in a first extrusion of the side frame member from FIG. 4E according to an embodiment. FIGS. 5D, 5E, 5F and 5G are top, side, perspective and end views of the cord pulley assembly 70 according to an embodiment. FIG. 5H is a perspective view of the third guide pulley 140 in the side frame member 101 in which the distal end of the cord 122 (for attachment to the distal end of the screen 113) is anchored in cord retaining slot 78.

The cord pulley assembly 70 comprises a pulley 74 located between a front portion 71 and a rear portion 72 and supported by T shaped mounting projection 73 which is received in slot 54 of the first extrusion to retain the pulley (and constrain the location). A releasable fastener 77 in the front portion 72 may be used to secure the cord pulley in a fixed position. In this embodiment the fastener 77 is a screw, and the cord may be fastened to the side frame member by engaging the screw against slot 54. Other fastening arrangements may be used. A V section 75 with a small gap is formed between the rear of the pulley 74 and the front of the rear portion 72. The gap is smaller than the thickness of the cord 122 such that the cord is compressed as it is passes through the V section when it is being inserted around the pulley 74. Further the pulley 74 contains a recessed track 76 to fully encapsulate the cord 122. The encapsulation of the cord and V-shaped section thus act to ensure the cord is retained in the pulley. In this embodiment the rear section 72 comprises a cord retaining slot 78 which is used to secure the distal end of the cord. This is illustrated in FIG. 5H which is a perspective view of the third guide pulley 140 in the side frame member 101 in which the distal end of the cord 122 from fifth guide pulley 150 (not shown) is anchored in the cord retaining slot 78. During installation the cord is removed from the cord retaining slot 78 and attached to the distal end of the screen 113 (as shown in FIG. 1I). However in other embodiments the cord retaining slot 78 may be omitted such that rear section 72 is a solid section. Embodiments of the cord pulley assembly 70 may be used as the first guide pulley 124, second guide pulley 125, and the third guide pulley 140 (the first and second guide pulleys without the cord retaining slot 78, and the third guide pulley 140 including the cord retaining slot 78). The tension adjustment arrangement 130 may be a modified cord pulley 70 with a spring anchor located in the front portion 71. The fifth guide pulley 150 located in lower corner bracket may also use a modified cord pulley assembly 70 featuring an encapsulated pulley 74 with a recessed track 76, and a V section 75 to prevent derailing of the cord.

The screen 111 may comprise a semi-opaque or opaque material or block-out material to provide privacy or to reduce the amount of light passing through the screen opening, i.e. for use as a block-out window blind. Alternatively the screen 111 may be a mesh material, such as plastic or wire mesh material with apertures sized to allow air flow whilst preventing the entry of insects or other matter such as leaves/litter (e.g. a fly screen mesh). When fully extended the screen 111 covers the screen opening 105. A pile seal may be located at the distal end of the screen 113. The screen may also be referred to as a blind. In the above embodiments the screen may be driven by hand by grasping the distal edge 113 of the screen to extend or retract the screen 111 across the screen opening. Movement of the screen drives the cord 122 and thus the axle pulley and roller tube to extend or retract the screen 111 across the screen opening 105. In another embodiment a motor may be used to drive the roller tube 112. In some embodiments the motor is a tube motor located within the roller tube 112. In those embodiments a removable cable cover 14*a* is provided to provide access for laying cables associated with the motor.

The frame is formed of frame members 101, 102, 103, 104 and upper and lower corner brackets 10, 160 which are assembled to form a housing for internal components of the system. When installed the frame members act or provide a rigid structure for mounting of the components of the screen system. The frame members may be thin sheets or extrusions manufactured from suitable materials such as aluminium alloys, steel alloys, and plastics. The frame members, together with the corner brackets form a frame around the screen opening and house the roller tube, axle pulley cord, and tension adjustment arrangement. The frame members may be composed of multiple components. For example the side frame members 101, 102 may be formed of a combined rear 52 and side 51 wall section and a removable cover section 57 to provide access to components housed within the frame (e.g. as shown in FIGS. 4B and 4E). The cover 57 may clip into side wall 52 as illustrated in FIGS. 4B and 4E. Additional components such as wall 128 may be attached to the side wall 51, such as by slotting into a slot 56 formed in the side wall. Similarly the top member 101 may be formed as a top 41 and rear 42 section into which a cover section is clipped to allow access to the roller tube 112, such as for insertion or removal.

In some embodiments the system may be provided as a kit, comprising a pair of side frame members 101, 102, a top frame member 103, a bottom frame member 104, a pair of upper corner brackets 10 and a pair of lower corner brackets 160, one or two tension adjustment arrangements 120, and a roller tube 112 on which a screen (or blind) 111 is wound. Other components and installation instructions may also be included as required. An upper corner bracket 10 and a lower corner bracket 160 may be attached to a side frame member, and house a tension adjustment arrangement 120, with the axle pulley 22 locked by wedge 18 of locking mechanism and distal end of the cord 122 attached to the cord retaining slot 78 of the third guide pulley 140. In some embodiments the cord in the tension adjustment arrangement is loose (minimal tension), but the cord is prevented from derailing by the encapsulated pulleys and V section 75. In other embodiments the tension adjustment arrangement is pre-tensioned with guide pulleys in appropriate positions (again with the cord prevented from derailing by the encapsulated pulleys and V section 75). The system may be installed by clipping the top frame member 103 to the corner brackets 10 attached to the first and second side frame members 101, 102 and then clipping the bottom frame member 104 to the bottom corner brackets 160 attached to the first and second side frame members 101, 102. The covers of the side frame members and top frame members may be removed and the assembled frame inserted into the window frame. Jacking screws or other fasteners may be engaged to lock the assembled frame in the window frame. The roller tube may then be slotted into the slots 25 in the axle pulleys in the top corner brackets until projections 208 are received in receiving channels 26. The screen may then be partially unwound and fed into channel 128. The cord 122 may then be removed from the cord retaining slot 78 of the third guide pulley 140 and attached to the distal end of the screen 113 and the lock released by sliding lock member 19. Final adjustment of tension may be performed, for example by adjusting location of cord pulleys 70. The covers may then be placed back over frame members.

In some embodiments a motor arrangement may be used to drive rotation of the roller tube 112. In these embodiments, a tubular motor 270 may be located within the roller tube and the corner bracket shown in FIGS. 2A to 2F may be modified by removal of the spring assist mechanism and incorporation of motor components and modification of the some of the parts of the corner bracket. The tubular motor 270 may be an integrated module comprising a motor to drive rotation of a spindle 280 which drives rotation of the roller tube 112, a motor controller which controls the motor, and a battery.

The motor controller may be configured to control the speed and direction of the rotation of the spindle and include a power module that generates required voltages and signals using power from the battery, and monitors the battery state of charge, and controls battery recharging. The motor controller may also include a wireless interface configured to receive wireless control commands from a remote controller (with a transmitter) via a receiver wired to the motor controller. The control commands may be simply commands such as direction, i.e. clockwise rotation or counter-clockwise rotation, which the motor controller interprets and then controls the motor to drive rotation of the spindle in the requested direction at a fixed speed. Automatic stops may be programmed, or limit sensors used to stop rotation when the roller blind is fully wound or unwound. In some embodiments the control commands may include a stop command. In some embodiments the control commands may include a speed command, such as fast or slow, which the motor controller interprets and applies appropriate power to the motor to drive rotation at the desired speed. The remote controller may comprise a battery, wireless interface and user interface such as a pair of buttons (up and down) or three buttons (up, down and stop buttons). The remote controller may also incorporate a microcontroller. The wireless interface in the remote controller may communicate with the wireless interface in the motor body 270 according to a predefined or proprietary communications protocol included coded or modulated protocol using the ISM, or other unlicensed or licensed radio frequency bands. For example coded systems using on-off keying (OOK), frequency shift keying (FSK) or other amplitude or frequency modulation based coding systems to encode commands. More sophisticated communications protocols such as Bluetooth and ZigBee based protocols may also be used.

In one embodiment the wireless interface is a radio frequency interface and the receiver is a wire cable antenna 286 located within the roller tube 112 and directly connected to the tubular motor 270, or a wire cable antenna 246 in the corner bracket 10 or a frame member via a connector interface (244, 262) provided in the corner bracket 10. This enables the antenna to be hidden within the frame. In another embodiment the wireless interface is an infra-red or light based interface and the receiver, which may be an infrared receiver diode or similar device, is located in an opening formed in an external surface of the corner bracket or the frame such that the receiver is capable of receiving light signals from a nearby remote controller (e.g. in the same room as the blind). The receiver is then wired back to the motor controller (and wireless interface) via wires within the corner bracket and possibly also the frame housing (depending on the receiver location). A wired interface could also be provided in which wires are run from the motor controller to an input device located on the frame surface, such as one or more switches, buttons, rockers, dials etc.

In some embodiments the battery is a rechargeable battery such as one based on Lithium Ion technology, or similar technology which may be charged by a power connector 232 provided in an external surface of the corner bracket 10. The power connector is then wired back to the battery in the tubular motor via the connector interface (244, 262). In some embodiments the connector is a USB connector 242, such as a micro-USB type connector, mini-USB connector or USB Type-C connector, configured as a two wire connector. The two wires may be a ground wire (GND) wire and a positive wire (VCC) power, such as +5V, or positive and negative wires. In some embodiments the receiver may be a transceiver and the motor controller is configured to transmit information to the remote controller, such as low power to indicate the battery needs to be recharged. Additionally or alternatively, the motor controller may include an audio device to emit an audio signal in the case that low power is detected to allow recharging or replacement of the battery.

Figures 6A, 6B, 6C, 6D, 6E:
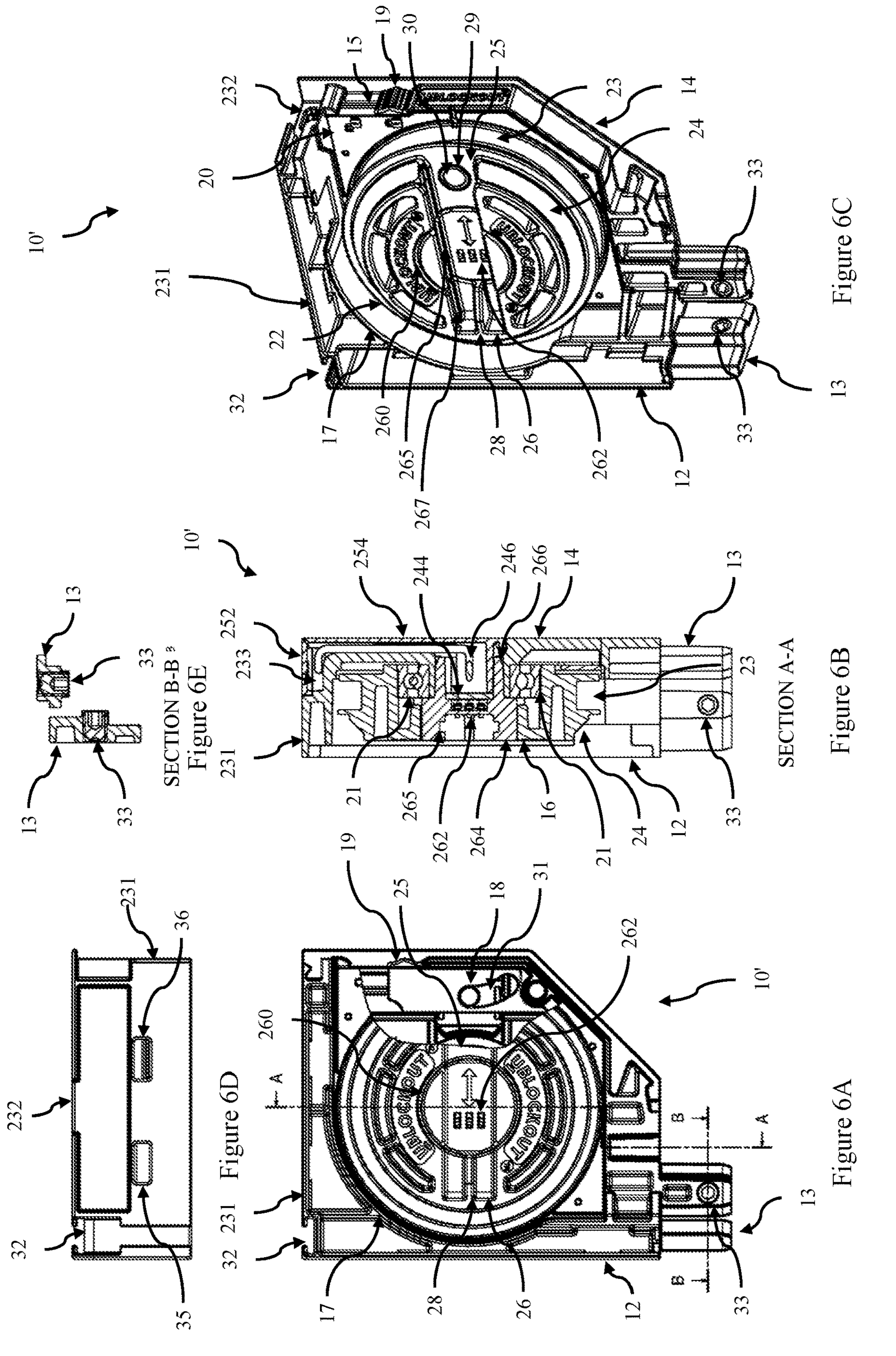
FIGS. 6A to 6N show an embodiment of a corner bracket 10' incorporating a wiring loom 240 and a keyed torque stub 260 with electrical connectors 262 configured to receive a roller tube incorporating a tubular motor 270 and a motor head adapter 274 with multiple electrical contacts. In some embodiments a central support similar in function and structure to the keyed torque stub 260 may be used in place of the keyed torque stub 260. The corner bracket 10' is based on the corner bracket 10 illustrated in FIGS. 2A to 2D.
FIG. 6B is a perspective view of a corner bracket according to an embodiment.
FIG. 6C is a section view through section A-A of FIG. 6B.
FIG. 6D is a top view of a corner bracket according to an embodiment.
FIG. 6E is a section view through section B-B of FIG. 6B.
Figure 6F:
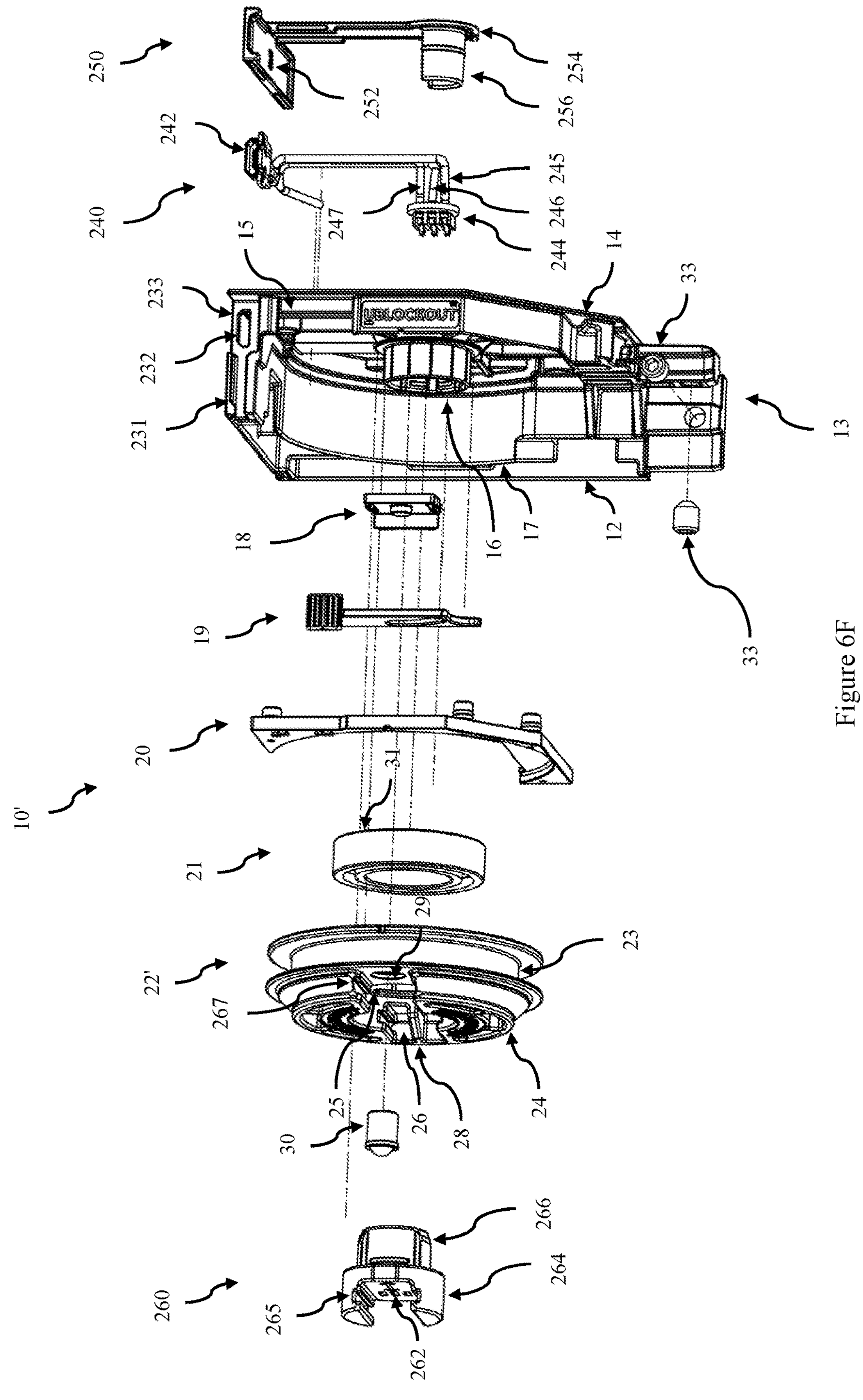
FIG. 6F is an exploded view of the corner bracket of FIGS. 6A and 6B according to an embodiment.
Figures 6G, 6H, 6I:
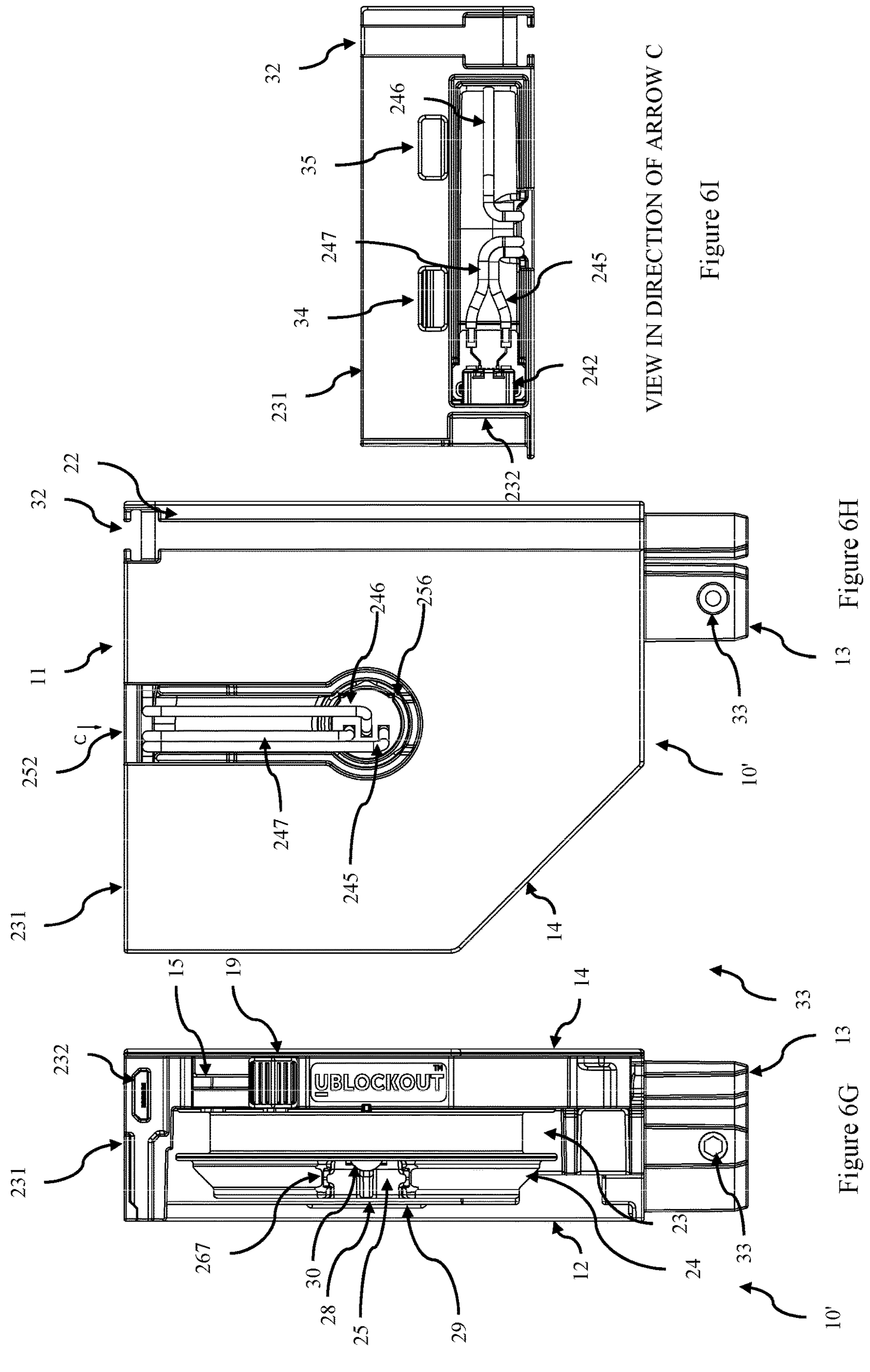
FIG. 6G is a front view of a corner bracket according to an embodiment.
FIG. 6H is an exterior side view of a corner bracket with the cable cover removed according to an embodiment.
FIG. 6I is a top view of a corner bracket with the cable cover removed according to an embodiment.
Figures 6J, 6K, 6L, 6M, 6N:
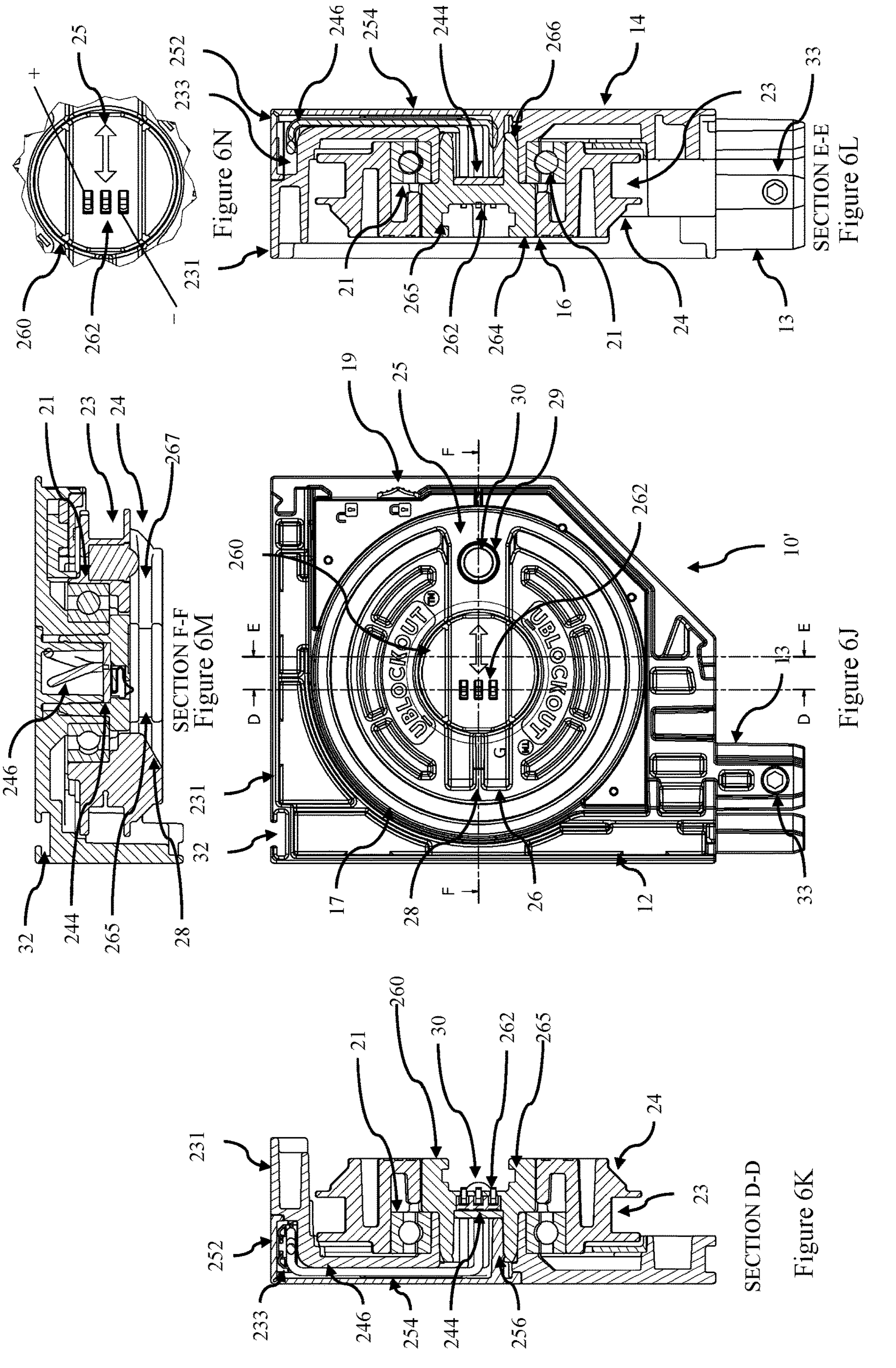
FIG. 6J is another inner side view of the corner bracket 10 showing the omitted portion of FIG. 6A.
FIG. 6K is a section view through section DD of FIG. 6J.
FIG. 6L is a section view through section EE of FIG. 6J.
FIG. 6M is a section view through sections FF of FIG. 6J.

FIGS. 6A to 6M show an embodiment of a corner bracket 10' incorporating a wiring loom 240 and a keyed torque stub 260 with electrical connectors 262 configured to receive a roller tube incorporating a tubular motor 270 and a motor head adapter 274 with multiple electrical contacts. In some embodiments a central support similar in function and structure to the keyed torque stub 260 may be used in place of the keyed torque stub 260. The corner bracket 10' is based on the corner bracket 10 illustrated in FIGS. 2A to 2D. FIGS. 6A, 6B and 6D are an inner side, perspective and top view of the corner bracket 10' according to an embodiment. In FIG. 6A, a portion of the pulley has been omitted to illustrate the locking mechanism similar to FIG. 2A. FIGS. 6C and 6E are section views through sections A-A and B-B of FIG. 6B. FIG. 6F is an exploded view of the corner bracket 10' according to an embodiment. FIGS. 6G, 6H and 6I are front, exterior side, and top views with the cable cover 250 removed to improve clarity. FIG. 6J is another inner side view of the corner bracket 10' showing the omitted portion of FIG. 6A, and FIGS. 6K, 6L, 6M and 6N are section views through sections DD, EE, FF and Detail G of FIG. 6J. In FIGS. 6A to 6F the cord 122 has been omitted for clarity. Common parts in FIGS. 2A to 2F and 6A to 6F are shown using the same part numbers.

Figures 7A, 7B, 7C, 7D:
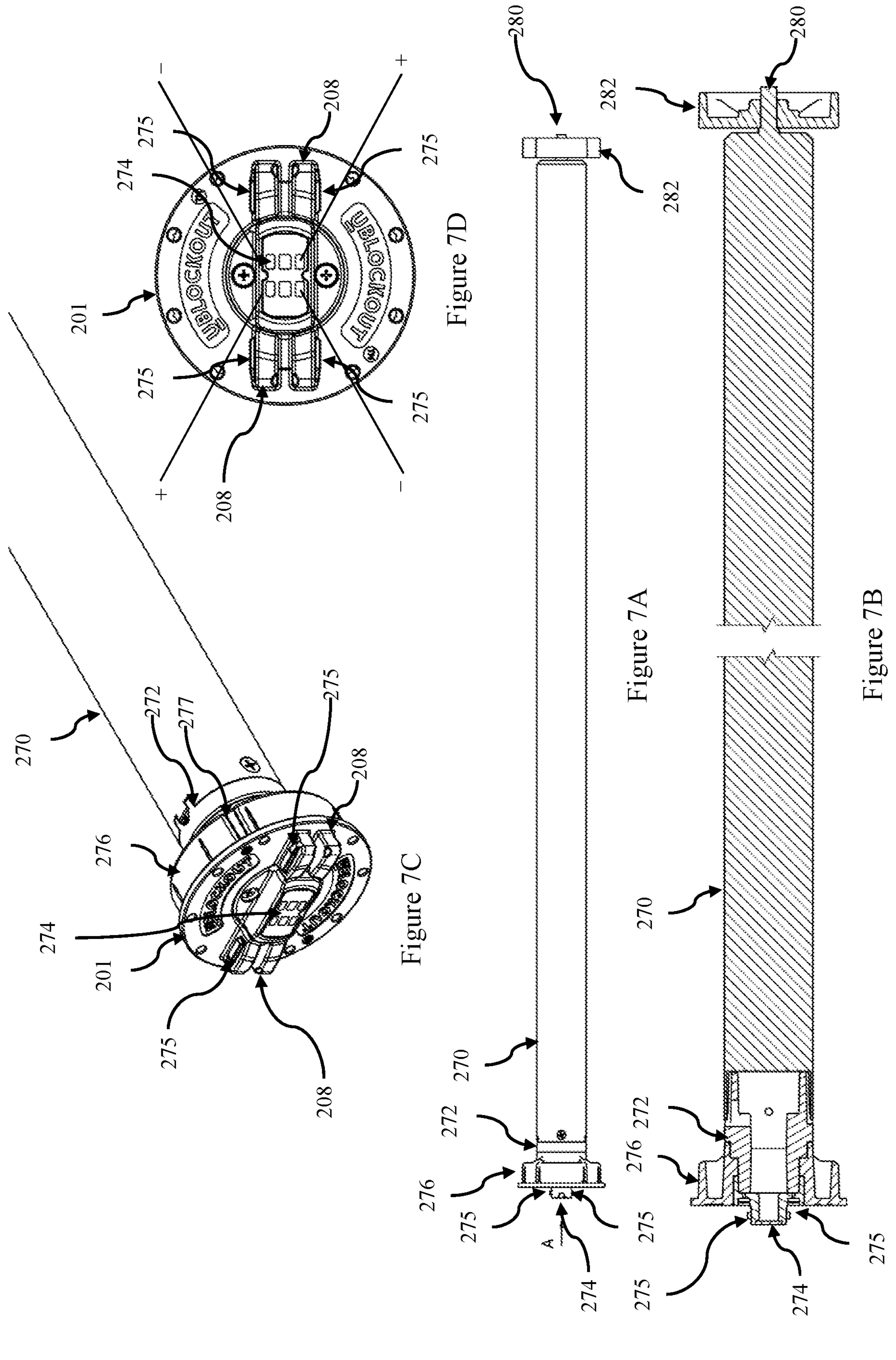
FIG. 7A is a side view of a tubular motor incorporating a motor head with six electrical contacts according to an embodiment.
FIG. 7B is a side sectional view of a tubular motor incorporating a motor head with six electrical contacts according to an embodiment.
FIG. 7C is a perspective view of a tubular motor incorporating a motor head with six electrical contacts according to an embodiment.
FIG. 7D shows an end view in the direction of arrow A of FIG. 7A according to an embodiment.
Figure 7E:
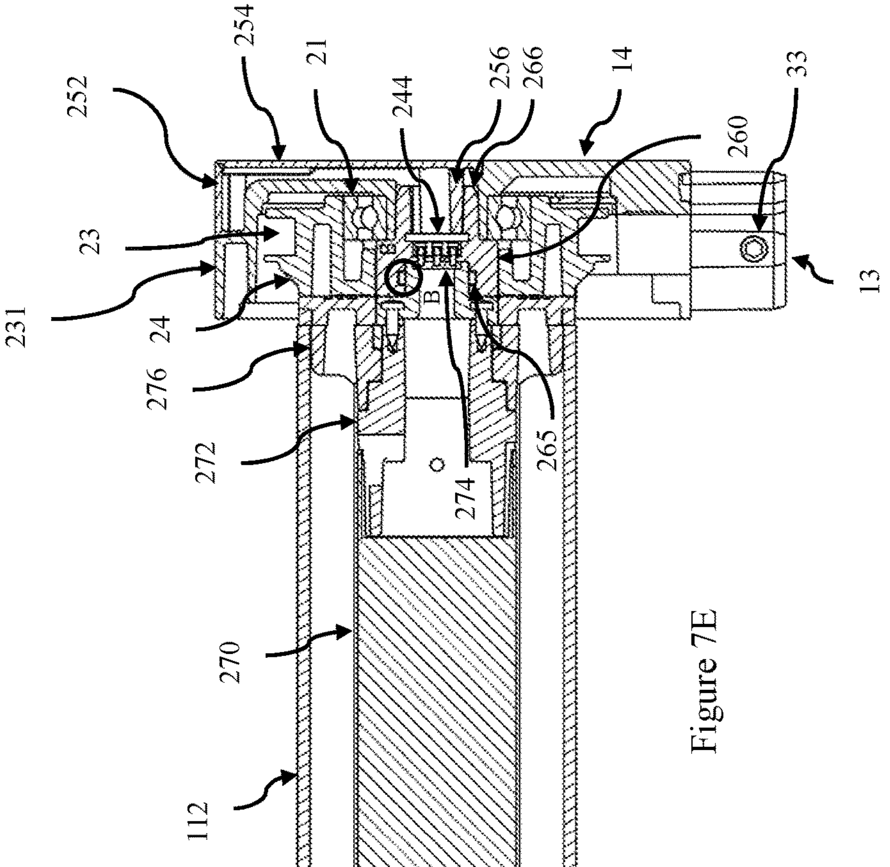
FIG. 7E is a side sectional view of the tubular motor assembled in a corner bracket assembly according to an embodiment.
Figure 7F:
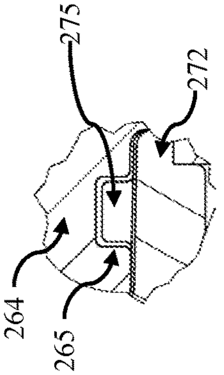
FIG. 7F is a magnified view of feature B in FIG. 7E according to an embodiment.
Figure 7G:
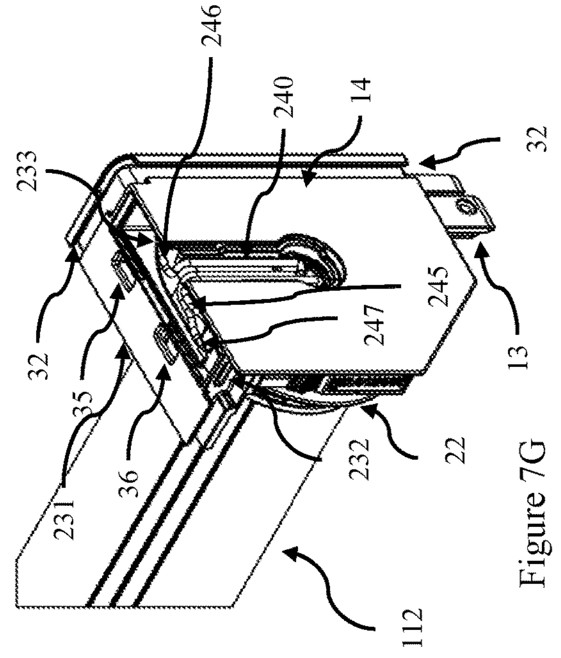
FIG. 7G is an end perspective view of the tubular motor assembled in the corner bracket assembly according to an embodiment.
Figures 8A, 8B, 8C, 8D:
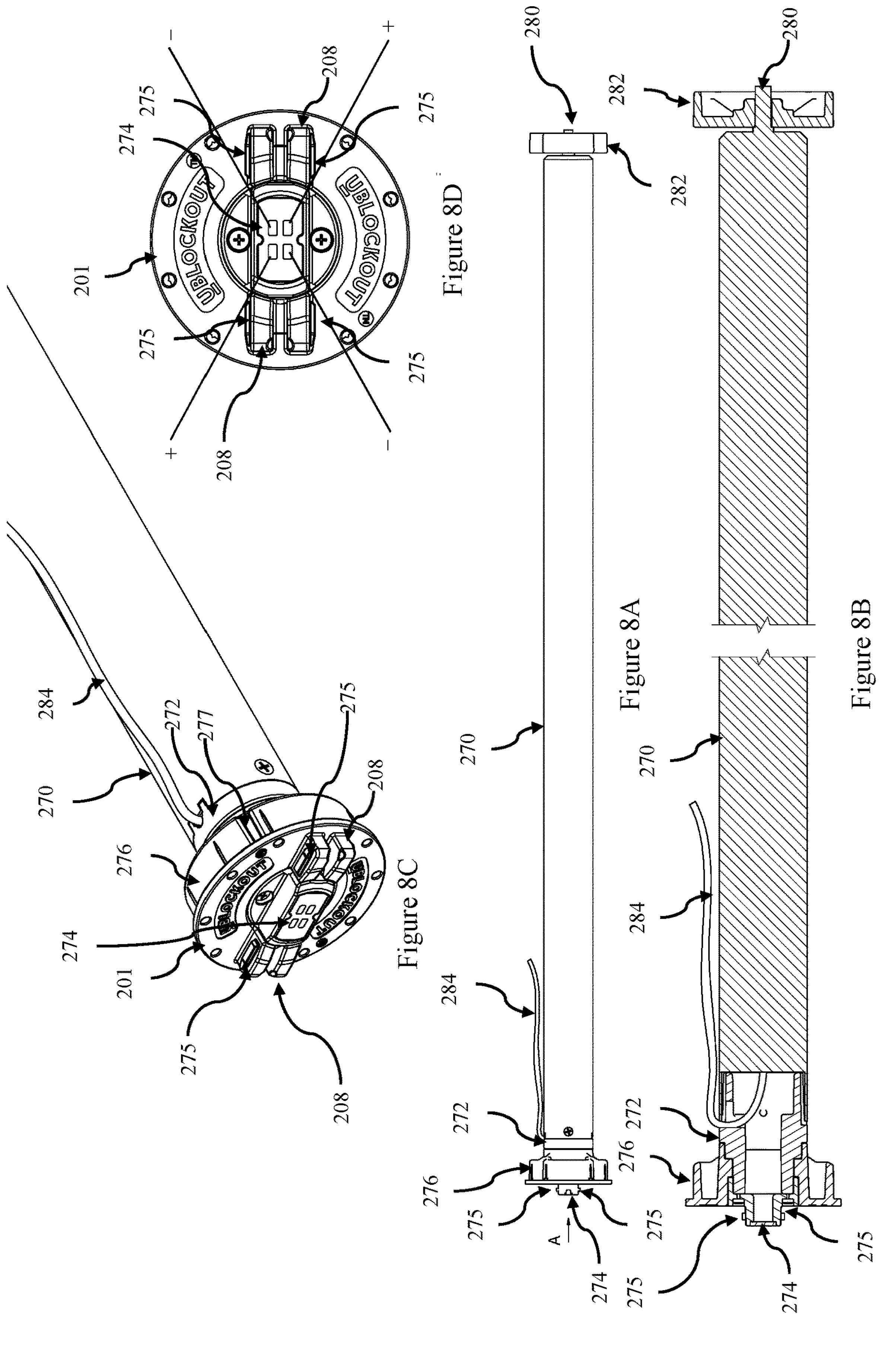
FIG. 8A is a side view of a tubular motor incorporating a motor head with four electrical contacts according to an embodiment.
FIG. 8B is a side sectional view of a tubular motor incorporating a motor head with four electrical contacts according to an embodiment
FIG. 8C is a perspective view of a tubular motor incorporating a motor head with four electrical contacts according to an embodiment.
FIG. 8D shows an end view in the direction of arrow A of FIG. 8A according to an embodiment.

FIGS. 7A to 7E show an embodiment of a tubular motor 270 incorporating a motor head 274 with six electrical contacts and FIGS. 8A to 8E show an embodiment of a tubular motor 270 incorporating a motor head 274 with four electrical contacts. FIGS. 7A, 7B and 7C show side, side sectional, and perspective views of the tubular motor 270 incorporating a motor head 274 with six electrical contacts, and FIG. 7D shows an end view in the direction of arrow A of FIG. 7A. Similarly FIGS. 8A, 8B and 8C show side, side sectional, and perspective views of the tubular motor 270 incorporating a motor head 274 with four electrical contacts, and FIG. 8D shows an end view in the direction of arrow A of FIG. 8A. FIGS. 7E and 8E are side sectional views of the tubular motors assembled in the corner bracket assemblies, FIGS. 7F and 8F are magnified views of feature B in FIGS. 7E and 8E respectively, and FIGS. 7G and 8G are end perspective views of the tubular motors assembled in the corner bracket assemblies.

The corner bracket 10' shown in FIGS. 6A to 6N comprises a top wall 231 with a cavity 233. The front wall of the cavity 233 is formed with a USB connector support aperture (or housing) 232 accessible from the front of the corner bracket 10' and above the lock slide 15 and guide slot 15. A wiring loom 240 comprising three wires, namely a positive wire 245, an antenna wire 246 and a ground or negative wire 247. The positive wire 245 and ground or negative wire 247 are wired between a USB connector 242 and a spring contact PCB board 244. The antenna wire 246 is wired to the spring contact PCB board 244 with the distal end of the antenna wire located in the cavity 233. The USB connector 242 is received and supported in the USB connector support aperture (or housing) 232. In this embodiment the USB connector 242 is a micro USB connector, although as noted above, other USB connectors such as a mini USB or USB-C connector may be used. The USB connector is wired to positive wire 247 and ground or negative wire 245.

A cable cover 250 comprising a top cover 252, side cover 254 and lower wiring loom support 256 is also provided. The top cover 252 snap fits into the top of the cavity 233 in the top wall 231 and the side cover snaps fits into the side wall 14. The lower wiring loom support 256 supports the three wires 245, 246, 247 that are connected to the spring contact PCB board 244 and is received in the central aperture of keyed torque stub 260 (which is a modified version of torque stub 27). As shown in FIG. 6L, the lower wiring loom support 256 is received within, and supported by, the proximal wall section 266 of the keyed torque stub 260. The spring contact PCB board 244 comprises a spring contact for each wire, each of which is an elongate spring. In this embodiment there are three spring contacts, each wired to one of the positive wire 245, an antenna wire 246 and a ground or negative wire 247. The interior face of the distal flange section is formed with three slotted apertures 262 such that each of the spring contacts on the spring contact PCB board 244 projects through a respective slotted aperture 262. The spring contact plate 244 comprises a spring contact for each wire, each of which is an elongate spring.

The keyed torque stub is further configured with key slots 265 in the inner walls of the distal flange section 264. Similarly matching key slots 267 are provided in side walls of the roller tube support structure 25 which form slot 25 of the axle pulley 22. These key slots 265, 267 are configured to receive key projections 275 formed in the side walls of the locking projections 208 formed on the front face of the motor crown wheel 276. Thus as the roller tube is slid into the front of the corner bracket, the keys 275 on the locking projections are guided along and retained in slots 265 and 267 to ensure that the electrical contacts on the proximal face of the motor head 275 are pulled tightly against and then held in contact with the spring contacts 244 projecting through apertures 262 to ensure a firm and constant electrical connection. This is shown in more detail in FIGS. 7F and 8F respectively which is a close up view of detail B in FIGS. 7E and 8E respectively.

As shown in FIGS. 7A to 7F and 8A to 8F, the proximal end of the tubular motor 270 is connected to, or fitted with, a motor head adapter 272 on which is fitted a crown wheel 276 with end surface 201 on which two pairs of locking projections 208 are formed. The rim portion of the crown wheel 276 receives and supports the roller tube and is formed with key receiving slots 277 which receive keys formed on the interior surface of the roller tube 112 to key and lock the crown wheel 276 to the roller tube 112, and in turn, to the axle pulley 22 via projections 208 retained and held in slot 25.

The distal end of the tubular motor 270 comprises a motor spindle 280, which is driven by the motor controller, and which is received in an aperture passing through the motor drive wheel 282. The motor spindle 280 is configured to drive rotation of the motor drive wheel when it is rotated (under control of the motor controller). The motor spindle 280 may be a spindle with a non circular cross sectional profile (e.g. rectangular, hexagonal, etc.) so that it is keyed into a matching shaped aperture passing through the motor drive wheel 282 to drive rotation of the motor drive wheel when the spindle rotates. Other arrangements could be used such as a spindle ending in multiple prongs to pass through matching apertures in the motor drive wheel. If multiple prongs are used, the spindle and/or the prongs may have a circular cross sectional profile. The motor drive wheel 282 also comprises slots to receive the keys formed in the inner surface of the roller tube 112 to lock the motor drive wheel 282 to the roller tube 112. Hence rotation of the motor spindle 280 by the tubular motor 270 also drives rotation of the roller tube (via motor drive wheel 282), and in turn the crown wheel 276 (which is also keyed to the roller tube) and axle pulley 22. The proximal end of the motor body 280, and thus the motor head adapter 272 and motor head 274, remain fixed in position, along the keyed torque stub 260 whilst the crown wheel 276 and pulley rotate with respect to the motor head adapter. Thus electrical connections remain static and unaffected by rotation of the roller tube 112 and axle pulley 22.

The use of the slot 25 allows frontal insertion of the roller tube 112 into the corner bracket. This allows the roller tube to be inserted in two orientations (i.e. a first orientation or 180° rotated orientation). As shown in FIG. 6N, the electrical spring contacts 244 located within the slot 25 and projecting through apertures 262 in the keyed torque stub 260 are in a specific orientation, for example ground or negative connector (wire 247) above the antenna connector (wire 246), which is above the positive connector (wire 245) as shown in FIGS. 6H and 6N. If only a single electrical contact for each polarity, and the antenna is provided in the motor head 274, then the roller tube must be inserted in the correct orientation to match the polarity. This can be achieved by marking or colour coding each of the connectors. In another embodiment, such as that illustrated in FIGS. 7A to 7F, multiple contacts are provided for each polarity and the antenna connection. That is six contacts are provided in the motor head 274, arranged in three rows and two columns, where the polarity of the rows is reversed in the two columns. e.g. first column is (+, antenna,−) and the second column is (−, antenna, +). This provides 180° rotational symmetry and allows the roller tube to be inserted in either orientation whilst ensuring matching of the polarity of the electrical contacts with the polarity of the spring contacts 244.

Similarly FIGS. 8A to 8F shows an embodiment with four contacts. In this embodiment no antenna contact is provided on the motor head, and instead a separate antenna wire 284 is connected to the motor body 270 and fed into the annular cavity between the motor body 270 and the roller tube 112. In this embodiment the electrical contacts are arranged in two rows and two columns, again with the polarity of the rows in the first column being the reverse of the polarity of the rows in the second column. e.g. first column is (+, −), whilst the second column is (−, +) as shown in FIG. 8D. In this embodiment the two rows may be spaced apart so that the contacts match the position of the positive and negative spring contacts of the three contact connector 244 and three wire wiring loom 240. In this case the antenna wire 245 in the wiring loom is not connected or used. Alternatively the wiring loom 240 may be constructed as a two wire loom omitting the antenna wire 245, and the spring connectors 244 comprise two spring connectors (positive and negative connectors), omitting the antenna connector.

The choice between whether an antenna is provided within the roller tube cavity (e.g. four contact system) or whether it is connected to the antenna wire 245 located in the corner bracket (e.g. six contact system) can be based on operational concerns. Using the antenna in the corner bracket is typically beneficial in terms of signal strength (can detect weaker signals), however having the antenna inside the tube allows the use of the four contacts connector which requires less external wiring and allows more space on the motor head. Such additional space on the motor head could be used to potentially add one or more programming buttons to further configure operation of the motor.

Embodiments of the bracket illustrated in FIGS. 6A to 6N may be used with both a manually rotated (i.e. un-motorised) spring assist system, and with a motorised system. That is the embodiment of the corner bracket with spring contacts may be supplied for use with spring assist systems to allow a later switch to a motorised version. Conversion from a spring assist system to a motorised version then only requires removal of the spring assist tube adapter (shown in FIGS. 2E to 2G) from the proximal end of the roller tube 112, and insertion of the tubular motor 270 with crown wheel adapter 276 and motor head incorporating the electrical contacts 274 into the proximal end of the roller tube 112. The end adapter 282 used for the motorised version may also be used with the spring assist version.

Additionally the motorised roller tube comprising the tubular motor 270 with crown wheel adapter 276 and motor head incorporating the electrical contacts 274 could be used with other roller tube blind systems to allow forward loading of a motorised system. That is, it is not limited to use with the corner bracket 10' shown in FIGS. 7A and 7N. For example it could be used with a corner bracket omitting the cord locking mechanism or cord tensioning system, and could be used with any corner bracket configured to include a keyed torque stub 260 as illustrated in FIGS. 6C, 7E and 7F to receive the motorised roller tube arrangement as shown in FIGS. 7A to 7G, or 8A to 8G. In this embodiment the crown wheel 276 would not need to engage with the pulley 22, or any other external similar mechanism. Instead the keyed torque stub 260, or similar mechanism such as central support, is only required to receive and retain the motor head 274.

Thus in one embodiment, the screen system comprises at least atop frame member, a roller tube, a screen wound on the roller tube and a corner bracket. The roller tube houses a tubular motor and a drive wheel within an interior cavity of the roller tube. A distal end of the tubular motor comprises a spindle which passes through the drive wheel, and the drive wheel is locked to the roller tube such that rotation of the spindle drives rotation of the roller tube. A proximal end of the tubular motor is connected to a motor head with a plurality of electrical contacts on a proximal face wherein at least two of the plurality of electrical contacts are connected to a battery located in the tubular motor, and a proximal end of the roller tube comprises a crown wheel located over the motor head and locked to the roller tube and mounted such that the crown wheel can rotate with respect to the motor head. At least one locking projection is formed on a proximal surface of the crown wheel (or roller tube). An antenna is connected to the tubular motor. In use, the tubular motor is configured to drive rotation of the spindle in response to receiving a drive command from a remote controller via the antenna.

The corner bracket comprises a roller tube support structure comprising a central support and a slot wherein the slot comprises a slot opening, a central section, and at least one receiving cavity opposite the slot opening, and the central support is configured to form the central section of the slot, and a face of the central support located in the central section of the slot comprises a plurality of electrical spring contacts which are connected to an power connector provided in an external surface of the corner bracket. In use, the roller tube is inserted into the slot and the at least one receiving cavity receives the at least one locking projection located on the proximal surface of the crown wheel, and the electrical spring contacts provide an electrical connection to the electrical contacts such that the battery can be charged by power provided by the power connector. The central support could be the keyed torque stub or similar support structure. The antenna could be provided within the tubular motor in the interior cavity of the roller tube, or the antenna could be provided in the corner bracket, in which one of the spring contacts is connected to an antenna wire in the corner bracket, and a corresponding electrical contact is provided on the motor head.

Additional modifications and changes may also be made. In one embodiment bottom frame member 104 is removable, and may be omitted during installation (that is it may be fitted or removed as desired during installation). In such an embodiment, the remaining members need to be constructed or designed to have sufficient rigidity when installed to ensure normal operation of the system. This could be assisted by using a mounting arrangement located at the proximal end of each side frame member so that when installed in the window frame, the mount comprises a member that extends to lock the side members between the upper and lower window frame members. In another embodiment the side frame members are fitted with jacking screw mounting blocks. In these embodiments the jacking screws are screwed out to touch the side of the window frame once in position. This allows the installer to easily adjust the squareness of the frame prior to fixing permanently in place. The above embodiments are illustrative and other variations and modifications may also be made to suit specific installations or applications.

Embodiments of a corner bracket and side frame assembly and a screen system have been described which provide simplified installation and reduce the reliance on trained installers. The corner bracket integrates the axle pulley and allows separation of the axle pulley and cord tensioning system from the roller tube. Further the axle pulley is lockable, even under maximum cord tension. This allows assembly of the cord tensioning system and cord circuit at a factory and can be sent out in a kit form with the cord in an assembled and tensioned state. This allows separate assembly and installation of the frame prior to installation in the window frame. Once installed the roller tube can be slotted into the corner bracket and lock released. Embodiments also include encapsulated cord pulleys, a perimeter track to receive a pile seal, jacking screws and a removable bottom frame member. The use of a perimeter track with a pile seal enables provision of a complete blockout system. Embodiments of the corner bracket may be used with a manual system, including a manual system with spring assist mechanism, as well as with a motorised roller tube (i.e. incorporating a tubular motor within the roller tube). This provides flexibility and allows a single corner bracket to be used with either variant, and allows a customer to easily upgrade from a manual system to a motorised system.

Embodiments of the system facilitate easy, do it yourself installation of screen systems, including screen systems provided in a kit form. In a kit form the parts can be provided in a compact form enabling easy shipping. Additionally the kit can be sent with the cord pre-tensioned and the axle pulley locked by the locking mechanism. In one embodiment there is provided a method of installing a screen system as described herein wherein the cord is pre-tensioned and the axle pulley is locked by the locking mechanism comprising:

forming a frame by connecting the top frame member to each corner bracket, connecting the side frame member assemblies to each of the corner brackets and to the distal frame member;

insertion of the roller tube into the front of the frame by inserting each end of the roller tube into a matching slot in each corner bracket;

removing the second end of the cord from the side frame member and attaching the second end to the distal end of the screen to completing a cord drive circuit; and releasing the locking mechanism.

The method may further comprise pre-tensioning the helical spring prior to insertion of the roller tube into each slot in each corner bracket.

The reference to any prior art in this specification is not, and should not be taken as, an acknowledgement or any form of suggestion that such prior art forms part of the common general knowledge.

It will be understood that the terms “comprise” and “include” and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to “at least one of” a list of items refers to any combination of those items, including single members. As an example, “at least one of: a, b, or c” is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A screen system comprising:

a top frame member;

a first corner bracket and a second corner bracket configured to connect to the top frame member and configured to receive and support a roller tube, the first corner bracket defining a proximal side and the second corner bracket defining a distal side, wherein the first corner bracket comprises a side wall with a roller tube support structure comprising at least a central support and a slot, the slot comprising a slot opening and the slot extends rearward from the slot opening and at least a central portion of the slot is defined by a top wall, a face and a bottom wall in the central support and the top wall and the bottom wall are parallel surfaces, and the face comprises a plurality of electrical contacts which are connected to a power connector provided in an external surface of the first corner bracket, the roller tube housing a tubular motor and a drive wheel within an interior cavity of the roller tube, wherein a distal end of the tubular motor comprises a spindle which passes through the drive wheel, and the drive wheel is locked to the roller tube such that rotation of the spindle drives rotation of the roller tube, and a proximal end of the tubular motor is connected to a motor head and the motor head has a proximal face with a plurality of electrical contacts wherein at least two of the plurality of electrical contacts on the proximal face are connected to a battery located in the tubular motor, and a crown wheel is located over the motor head and locked to the roller tube and mounted on the motor head such that the crown wheel can rotate with respect to the motor head and the motor head further comprises a projecting portion that extends proximally from a proximal end surface of the crown wheel and the projecting portion comprising a top wall and a bottom wall that define the proximal face on which the plurality of electrical contacts are located, wherein the top wall and bottom wall are parallel surfaces and the projection portion has a cross sectional profile matching the shape of the slot in the first corner bracket;

an antenna connected to the tubular motor wherein in use, the tubular motor is configured to drive rotation of the spindle in response to receiving a drive command from a remote controller via the antenna;

a screen wound onto the roller tube; and wherein, in use, the roller tube is inserted into a front side of the first corner bracket by inserting the projecting portion of the motor head into the slot opening until the electrical contacts in the face of the slot engage with the electrical contacts on the proximal face of the motor head to provide an electrical connection to the electrical contacts to enable the battery to be charged by power provided by the power connector in the first corner bracket.

2. The screen system as claimed in claim 1, wherein the roller tube support structure further comprises a bearing that supports an annular structure with a central aperture within which the central support is located and the annular structure comprises the slot opening and at least one receiving cavity opposite the slot opening forming an end portion of the slot and the central support forms the central section of the slot, and the proximal end surface of the crown wheel further comprises a pair of opposing locking projections, each locking projection having a top wall and a bottom wall and each locking projection has a cross sectional profile matching the shape of the slot in the first corner bracket such that when the roller tube is inserted into the slot, one of the pair of the opposing locking projections is received in the at least one receiving cavity of the slot and the other opposing locking projection is located in the slot opening to lock the roller tube with respect to the annular structure.

3. The screen system as claimed in claim 2 wherein each of the locking projections is formed with a key projection in the top wall and a key projection in the bottom wall and the respective top wall and bottom wall of the slot in the roller tube support structure comprises a key slot which is configured to receive the key projections as the roller tube is inserted into the slot and the key projections on the locking projections are guided along and retained in the key slots to ensure that the electrical contacts on the proximal face of the motor head are held in contact with the electrical contacts on the face of the slot in the first corner bracket.

4. The screen system as claimed in claim 3 wherein the key projection in the top wall and the key projection in the bottom wall of the locking projections, and the key slot in the respective top wall and bottom wall of the slot in the roller tube support structure, are configured to pull the proximal face of the motor head towards the roller tube support structure so that the electrical contacts on the proximal face of the motor head are pulled towards and then held in contact with the electrical contacts on the face of the slot in the first corner bracket.

5. The screen system as claimed in claim 2 wherein the at least one receiving cavity comprises a pair of receiving cavities separated by a wedge, and each of the locking projections is formed as a pair of locking projections such that when the roller tube is inserted into the slot the wedge is located between the pair of locking projections.

6. The screen system as claimed in claim 1 wherein the plurality of electrical contacts on the face of the first corner bracket comprises a positive electrical contact and a negative or ground electrical contact which are connected to the power connector, and an antenna electrical contact which is connected to an antenna wire located in the corner bracket, and the plurality of electrical contacts on the proximal face of the motor head comprises six electrical contacts arranged in two columns of three rows, wherein rows in the first column are ordered as a positive contact, an antenna contact and a negative contact, and the rows in the second column are in a reverse order so that in use, when the roller tube is inserted into the slot the electrical contacts on the proximal face of the motor head will match with the electrical contacts on the face of the first corner bracket regardless of an orientation of the roller tube.

7. The screen system as claimed in claim 1 wherein the plurality of electrical contacts on the face of the first corner bracket comprises a positive electrical contact and a negative or ground electrical contact which are connected to the power connector, and the plurality of electrical contacts on the proximal face of the motor head comprises four electrical contacts arranged in two columns of two rows, wherein the electrical contacts in the rows of the first column are ordered as a positive contact and a negative or ground contact, and the rows in the second column are in a reverse order so that in use, when the roller tube is inserted into the slot the electrical contacts on the proximal face of the motor head will match with the electrical contacts on the face of the first corner bracket regardless of an orientation of the roller tube, and an antenna cable is located within the roller tube and is directly connected to the tubular motor.

8. The screen system as claimed in claim 1, wherein the electrical contacts in the face of the slot in the first corner bracket are electrical spring contacts.

9. The screen system as claimed in claim 1, further comprising two side frame members and a bottom frame member, wherein the top frame member, corner bracket, two side frame members and bottom frame member further comprise a perimeter track comprising a pile seal.

10. A roller tube apparatus configured for use in a screen system comprising:

a top frame member;

a first corner bracket and a second corner bracket and the first corner bracket and the second corner bracket are each connected to the top frame member and the first corner bracket defines a proximal side and the second corner bracket defines a distal side, wherein the first corner bracket comprises a side wall with a roller tube support structure comprising at least a central support and a slot, the slot comprising a slot opening and the slot extends rearward from the slot opening and at least a central portion of the slot is defined by a top wall, a face and a bottom wall in the central support and the top wall and the bottom wall are parallel surfaces, and the face comprises a plurality of electrical contacts which are connected to a power connector provided in an external surface of the first corner bracket, and the roller tube apparatus comprising: a roller tube, a tubular motor, a drive wheel and a crown wheel, wherein the roller tube is configured to house the tubular motor and the drive wheel within an interior cavity of the roller tube, wherein a distal end of the tubular motor comprises a spindle which passes through the drive wheel, and the drive wheel is locked to the roller tube such that rotation of the spindle drives rotation of the roller tube, and a proximal end of the tubular motor is connected to a motor head and the motor head has a proximal face with a plurality of electrical contacts wherein at least two of the plurality of electrical contacts on the proximal face are connected to a battery located in the tubular motor, and the crown wheel is located over the motor head and locked to the roller tube and mounted on the motor head such that the crown wheel can rotate with respect to the motor head, and the motor head further comprises a projecting portion that extends proximally from a proximal end surface of the crown wheel and the projecting portion comprising a top wall and a bottom wall that define the proximal face on which the plurality of electrical contacts are located, wherein the top wall and bottom wall are parallel surfaces and the projection portion has a cross sectional profile matching the shape of the slot in the first corner bracket;

an antenna connected to the tubular motor wherein, when used, the tubular motor is configured to drive rotation of the spindle in response to receiving a drive command from a remote controller via the antenna;

a screen wound onto the roller tube; and wherein, when used, the roller tube apparatus is inserted into a front side of the first corner bracket of the screen system by inserting the projecting portion of the motorhead into the slot opening until the electrical contacts in the face of the slot engage with the electrical contacts on the proximal face of the motor head to provide an electrical connection to the electrical contacts on the proximal face of the motor head to enable the battery to be charged by power provided by the power connector in the first corner bracket.

* * * * *